(12) United States Patent
Haverty

(10) Patent No.: US 8,477,727 B2
(45) Date of Patent: Jul. 2, 2013

(54) METHODS FOR SURREPTITIOUS MANIPULATION OF CDMA 2000 WIRELESS DEVICES

(75) Inventor: James D Haverty, Boxborough, MA (US)

(73) Assignee: L-3 Communications Corporation, New York, NY (US)

( * ) Notice: Subject to any disclaimer, the term of this patent is extended or adjusted under 35 U.S.C. 154(b) by 351 days.

(21) Appl. No.: 12/846,633

(22) Filed: Jul. 29, 2010

(65) Prior Publication Data

US 2010/0309884 A1 Dec. 9, 2010

Related U.S. Application Data

(60) Provisional application No. 61/245,456, filed on Sep. 24, 2009, provisional application No. 61/229,481, filed on Jul. 29, 2009.

(51) Int. Cl.
| | |
|---|---|
| H04W 4/00 | (2009.01) |
| H04B 7/216 | (2006.01) |
| H04K 3/00 | (2006.01) |
| H04M 1/66 | (2006.01) |
| G06F 7/04 | (2006.01) |

(52) U.S. Cl.
USPC ............... 370/331; 370/338; 370/342; 455/1; 455/410; 726/3

(58) Field of Classification Search
USPC ................. 370/328, 329, 331, 335, 338, 343, 370/342; 455/410, 1; 726/2, 3
See application file for complete search history.

(56) References Cited

U.S. PATENT DOCUMENTS

| | | | |
|---|---|---|---|
| 4,498,193 A | 2/1985 | Richardson | |
| 5,001,771 A | 3/1991 | New | |
| 5,142,574 A | 8/1992 | West, Jr. et al. | |
| 5,239,557 A | 8/1993 | Dent | |

(Continued)

FOREIGN PATENT DOCUMENTS

| | | |
|---|---|---|
| WO | 2007016641 | 2/2007 |
| WO | 2007027699 | 3/2007 |
| WO | 2007106694 | 9/2007 |
| WO | 2008022175 | 2/2008 |

OTHER PUBLICATIONS

International Search Report dated Apr. 30, 2007, issued in corresponding International Application No. PCT/US06/33738.

(Continued)

*Primary Examiner* — Paul H Masur
(74) *Attorney, Agent, or Firm* — Onello & Mello, LLP

(57) ABSTRACT

Techniques for generating an interloping beacon which can control the behavior of a target wireless device on a CDMA frequency channel without noticeably altering the behavior of non-target wireless devices which share the frequency channel of the target wireless device's live beacon. The interloping beacon is an override beacon which overrides the live beacon's pilot channel and a control message on a code channel on which control messages may be addressed to the target wireless device. The override beacon provides the overriding pilot and the overriding control message only as long as is required for the target wireless device to respond to the overriding control message. The period of time during which the overriding pilot and the overriding control message are generated for the override beacon is so short that only the target wireless device responds without noticeable effect on collateral wireless devices.

22 Claims, 21 Drawing Sheets

U.S. PATENT DOCUMENTS

| | | | |
|---|---|---|---|
| 5,278,908 | A | 1/1994 | Parikh et al. |
| 5,517,675 | A | 5/1996 | O'Connor et al. |
| 5,706,333 | A | 1/1998 | Grenning et al. |
| 5,892,477 | A | 4/1999 | Wehling |
| 6,195,529 | B1 | 2/2001 | Linz et al. |
| 6,496,703 | B1 | 12/2002 | da Silva |
| 6,577,598 | B1 | 6/2003 | Hwang et al. |
| 6,654,589 | B1 * | 11/2003 | Haumont .................. 455/67.11 |
| 6,928,289 | B1 | 8/2005 | Cho et al. |
| 7,047,050 | B1 | 5/2006 | Khawand et al. |
| 7,126,979 | B2 | 10/2006 | Karlsson |
| 7,142,108 | B2 | 11/2006 | Diener et al. |
| 7,313,358 | B1 * | 12/2007 | Ricci ................................ 455/1 |
| 7,606,524 | B1 | 10/2009 | Frank |
| 8,140,001 | B2 | 3/2012 | Haverty |
| 2001/0036821 | A1 | 11/2001 | Gainsboro et al. |
| 2001/0039580 | A1 | 11/2001 | Walker et al. |
| 2003/0021418 | A1 | 1/2003 | Arakawa et al. |
| 2003/0086412 | A1 | 5/2003 | Jeong et al. |
| 2003/0143943 | A1 | 7/2003 | Kline |
| 2004/0063427 | A1 | 4/2004 | Narasimha et al. |
| 2004/0077339 | A1 | 4/2004 | Martens |
| 2004/0179488 | A1 | 9/2004 | Kim et al. |
| 2004/0203911 | A1 | 10/2004 | Masuda et al. |
| 2004/0213231 | A1 | 10/2004 | Cho et al. |
| 2005/0052995 | A1 | 3/2005 | Gu et al. |
| 2005/0058117 | A1 | 3/2005 | Morioka et al. |
| 2005/0089001 | A1 | 4/2005 | Nishikawa |
| 2005/0138433 | A1 | 6/2005 | Linetsky |
| 2005/0149949 | A1 | 7/2005 | Tipton et al. |
| 2005/0190784 | A1 | 9/2005 | Stine |
| 2005/0237954 | A1 | 10/2005 | Hasegawa et al. |
| 2005/0249149 | A1 | 11/2005 | Kasturi et al. |
| 2006/0018446 | A1 | 1/2006 | Schmandt et al. |
| 2006/0109811 | A1 | 5/2006 | Schotten et al. |
| 2006/0165073 | A1 * | 7/2006 | Gopinath et al. ............. 370/389 |
| 2006/0193274 | A1 | 8/2006 | Yamagata |
| 2006/0264168 | A1 | 11/2006 | Corbett et al. |
| 2007/0087767 | A1 | 4/2007 | Pareek et al. |
| 2007/0127421 | A1 | 6/2007 | D'Amico et al. |
| 2007/0230389 | A1 | 10/2007 | Amann et al. |
| 2007/0263672 | A1 | 11/2007 | Ojala et al. |
| 2007/0270127 | A1 | 11/2007 | Santoro et al. |
| 2008/0004045 | A1 | 1/2008 | Srey et al. |
| 2008/0020749 | A1 | 1/2008 | Delaveau et al. |
| 2008/0119130 | A1 | 5/2008 | Sinha |
| 2009/0209196 | A1 | 8/2009 | Haverty |
| 2009/0311963 | A1 | 12/2009 | Haverty |
| 2010/0068988 | A1 | 3/2010 | Valentine et al. |
| 2010/0226308 | A1 | 9/2010 | Haverty |
| 2010/0302956 | A1 | 12/2010 | Haverty |
| 2010/0304706 | A1 | 12/2010 | Haverty |
| 2011/0059689 | A1 | 3/2011 | Haverty |

OTHER PUBLICATIONS

International Search Report dated Apr. 11, 2008, issued in corresponding International Application No. PCT/US07/75972.

Borgonovo, Flaminio, et al., RR-Aloha, a Reliable R-Aloha broadcast channel for ad-hoc inter-vehicle communication networks, 2002, pp. 1-5.

International Search Report dated Aug. 17, 2007, issued in corresponding International Application No. PCT/US06/30159.

International Search Report dated Aug. 26, 2008, issued in corresponding International Application No. PCT/US07/63493.

"Methods of Remotely Identifying, Suppressing, Disabling and Access Filtering Wireless Devices of Interest Using Signal Timing and Intercept Receivers of Effect Power Reduction, Minimization of Detection, and Minimization of Collateral Interference" Specification, Drawings, Claims and Prosecution History of United States Patent Application No. 12/065,225, filed Feb. 28, 2008 by James D. Haverty, which is stored in the United States Patent and Trademark Office (USPTO) Image File Wrapper (IFW) system.

"Methods of Suppressing GSM Wireless Device Threats in Dynamic or Wide Area Static Environments Using Minimal Power Consumption and Collateral Interference" Specification, Drawings, Claims and Prosecution History of United States Patent Application No. 13/424,153, filed Mar. 19, 2012 by James D. Haverty, which is stored in the United States Patent and Trademark Office (USPTO).

"Node-Arbitrated Media Access Control Protocol for Ad Hoc Broadcast Networks Carrying Ephemeral Information" Specification, Drawings, Claims and Prosecution History of U.S. Appl. No. 12/377,583, filed Feb. 13, 2009 by James D. Haverty, which is stored in the United States Patent and Trademark Office (USPTO).

"Methods for Identifying Wireless Devices Connected to Potentially Threatening Devices" Specification, Drawings, Claims and Prosecution History of U.S. Appl. No. 12/538,662, filed Aug. 10, 2009 by James D. Haverty, which is stored in the United States Patent and Trademark Office (USPTO).

"Enhanced Methods of Cellular Environment Detection When Interoperating With Timed Interfers" Specification, Drawings, Claims and Prosecution History of U.S. Appl. No. 12/538,604, filed Aug. 10, 2009 by James D. Haverty, which is stored in the United States Patent and Trademark Office (USPTO).

"Using Code Channel Overrides to Suppress CDMA Wireless Devices" Specification, Drawings, Claims and Prosecution History of U.S. Appl. No. 12/877,064, filed Sep. 7, 2010 by James D. Haverty, which is stored in the United States Patent and Trademark Office (USPTO).

Langton, Charan, "Code Division Multiple Access (CDMA): The Concept of signal spreading and its uses in communications," 2002, 2006, pp. 1-18.

* cited by examiner

METHODS FOR SURREPTITIOUS MANIPULATION OF CDMA 2000 WIRELESS DEVICES

CROSS-REFERENCE TO RELATED APPLICATIONS

The present patent application claims priority from U.S. provisional patent application 61/229,481, James D. Haverty, Methods for Surreptitious Manipulation of CDMA 2000 Wireless Devices, filed Jul. 29, 2009, and from U.S. provisional patent application 61/245,456, James D. Haverty, Further methods of surreptitious manipulation of CDMA 2000 wireless devices, filed Sep. 24, 2009. The present patent application is further closely related to U.S. Ser. No. 12/065,225, James D. Haverty, Methods of Remotely Identifying, Suppressing and/or Disabling Wireless Devices of Interest, filed Feb. 28, 2008, which is the U.S. national stage of PCT/US2006/030159, filed Sep. 1, 2006.

Each of the above-listed applications is incorporated by reference into the present patent application in its entirety and for all purposes. The present application contains the complete Detailed Description of U.S. Ser. No. 12/065,225 as regards CDMA; the new material begins with the section, Minimizing collateral interference by using override beacons to override control messages in CDMA wireless systems and FIG. 12.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The invention relates to methods of controlling a transceiver to remotely interrogate wireless devices on demand in some prescribed operational area so as to identify the presence of said device, whether it is friend or foe, and subsequently disabling the device based on its disposition or enticing it to transmit to facilitate its location.

2. Description of Related Art

The widespread use of wireless devices in criminal and terrorist activities has made it desirable for law enforcement officials to be able to identify and subsequently suppress, ring, locate, or when necessary even disable clandestine wireless devices. Such devices may be concealed in containers or on persons, may be connected to detonators or other activators, or may be being used for purposes of terrorism, unauthorized intelligence collection. In some cases, the wireless device may even have been inadvertently enabled in a secure environment by legitimate subscribers. Law enforcement officials further need to be able to identify and quarantine wireless devices in emergency situations or in situations where use of wireless devices is prohibited, such as prisons, hospitals or baggage screening areas and to determine the identifying information of a wireless device prior to locating and intercepting the wireless device and collecting either voice or data from the wireless device.

Wireless devices operate as described in wireless communications standards such as CDMA, GSM, or UTMS. All of these standards prescribe specific conditions under which a wireless device registers for service with a providing system. Examples of such conditions include: upon power up of the wireless device; after some prescribed period of time determined by system parameters regularly broadcast by beacons contained in cell towers belonging to the providing system; or when movement of a wireless device requires re-registration. Re-registration is required when a wireless device moves from its current registration area to another registration area so as to facilitate the orderly routing of all incoming calls. Once a wireless device has registered or reregistered itself with a beacon, it begins interacting with the beacon. Until the wireless device again reregisters itself, it will interact with no other beacon. A wireless device is said to be monitoring the beacon it is currently interacting with.

The wireless standards further prescribe that a wireless device register (or re-register) with the system when the wireless device detects a beacon in its registration area that is "better" than the beacon the wireless device is currently monitoring. The "better" beacon has either greater signal strength or better quality compared to the beacon which the wireless device is currently monitoring. The wireless device obtains the thresholds for making such determinations from parameter settings in the beacon currently being monitored. For example, all beacons broadcast one or more messages that include parameters for determining when a wireless device monitoring the beacon is to register with the "better" beacon.

Enticing a Wireless Device to Register with a Baiting Beacon

The key to dealing with wireless devices that pose a security risk in an area of interest to the law enforcement personnel (termed herein an operational area) is to entice such a device to reregister with a baiting beacon that is under the control of the law enforcement personnel. A baiting beacon is a counterfeit beacon, i.e., a beacon that appears to the wireless device to belong to the network with which the wireless device interacts but is in fact not one of the network's beacons. A known method for making a wireless device register with a baiting beacon is to generate a baiting beacon that is like one in the current registration area but differs from it in two respects:

it has a power level which is greater than the power level of the strongest beacon that is detected in the operational area by more, than the strongest beacon's threshold amount; and it has broadcast settings that indicate that it is in a different registration area.

In response to this combination of greater power and different registration area, the wireless devices in the operational area will automatically re-register with the baiting beacon.

The technique of proffering a baiting beacon has been further refined in prior art to include a directional antenna so as to focus the baiting beacon's signal in a direction (where a wireless device of interest is presumed to be located). Directional focusing the baiting beacon both reduces both the required power consumption and the amount of interference with wireless devices that are not of interest. Such interference is termed in the following collateral interference. The obvious limitations of this technique are that it presumes some knowledge of where a device of interest is located and that it limits but does not eliminate collateral interference: any wireless device that is located within the directional beam will be affected, even if the device is outside the operational area.

Merely offering a baiting beacon whose signal in the operational area is stronger than that of any other beacon in the operational area has the intrinsic and fundamental limitation that collateral interference cannot be limited to the operational area. Because the baiting beacon's signal must be greater than that of the strongest beacon in the operational area, and that in turn means that the signal will reach far beyond the operational area. Merely offering a stronger baiting beacon further means that the minimum power level for the beacon must be a level which is just above the threshold of the strongest legitimate beacon in the operational area. The need for such high power levels makes it difficult to design portable baiting beacons that are both light in weight and have sufficient power to operate in close proximity to a legitimate beacon. Finally, the parameters received by the wireless devices from the legitimate beacon dictate how long the wireless device must detect the stronger signal before attempting to reregister, and that in turn determines how quickly a wireless device can be made to register with the baiting beacon.

Using baiting beacons to manipulate wireless devices in CDMA networks has an additional problem. In CDMA, a single frequency channel is code division multiplexed among a number of code channels. The code channels include common channels which all of the wireless devices interacting with a beacon interact with and traffic channels which carry data for specific calls and are encoded such that the traffic channel can only be interacted with by the wireless devices which are participating in the specific call. These traffic channels are the CDMA version of what is generally termed "dedicated channels". Because the code division multiplexing spreads the bits which carry the information for a particular multiplexed channel across the entire spectrum of the frequency channel, an attempt by a baiting beacon to baiting a message on one of the multiplexed channels may result in overriding information on others of the multiplexed channels. If the overridden information on the other channels is representations of voice data, the result may be noticeable degradation of service; if the overridden information is control data, the result may be dropped calls. In either case, the effects render surreptitious manipulation of target wireless devices difficult. It is an object of the techniques described in the portion of this application which begins with the section, Minimizing collateral damage by using override beacons to override control messages in CDMA wireless systems and FIG. 12 to provide a solution to these problems.

SUMMARY OF THE INVENTION

The foregoing object of the invention is attained in one aspect by using an interloping beacon to cause a target wireless device to respond to an overriding control message provided by the interloping beacon instead of the target wireless device's live beacon. The target wireless device operates on a frequency channel of the live beacon in a wireless network that operates according to a standard that employs code division multiplexing to define code channels in the frequency channel. The code channels include a pilot channel for a pilot provided by the live beacon, the target wireless device responding to the live beacon's pilot by listening for a control message provided by the live beacon on another code channel. The control message occurs in the other code channel at a location which is determined by the standard. The method is performed by a signal generator which generates the interloping beacon. The steps of the method are generating an overriding pilot on the live beacon's frequency channel to which the target wireless device responds instead of to the live beacon's pilot and on the live beacon's frequency channel, generating the overriding control message at the location in the other code channel specified by the standard for the control message provided by the live beacon. The overriding pilot and the overriding control message are generated by the signal generator only as long as required to cause the target wireless device to respond to the overriding control message instead of to the control message provide by the live beacon. As a consequence, causing the target wireless device to respond to the overriding control message does not cause another wireless device operating on the frequency channel to respond to the overriding pilot in a manner which is noticeable by a user of the other wireless device.

In other aspects, the other code channel may be a public channel or a dedicated channel. The public channel may be a paging channel in which the live beacon provides paging messages addressed to the target wireless device and the overriding control message may be a paging message. The paging message may be used to direct the target wireless device to another interloping beacon. The other interloping beacon may be a catch beacon which traps the target wireless device. The dedicated channel may be a traffic channel for the target wireless device, and the overriding control message may be any control message in the traffic channel.

Other objects and advantages will be apparent to those skilled in the arts to which this invention pertains, upon perusal of the following Detailed Description and drawings, wherein:

DETAILED DESCRIPTION OF THE INVENTION

Figure 1:
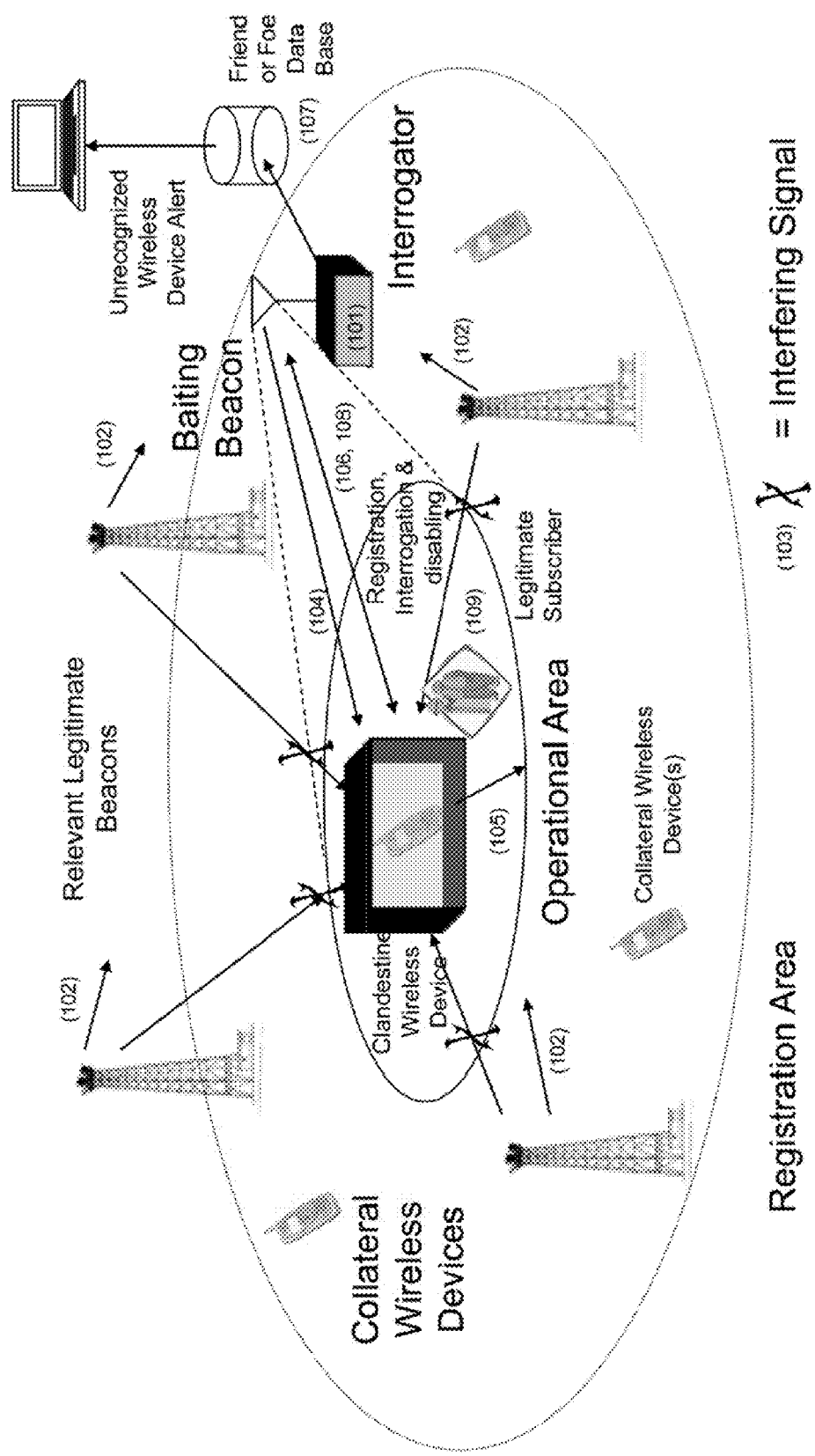
FIG. 1—shows one embodiment of an interrogation system including an interrogation transceiver and a lookup database to detect heretofore unknown wireless devices in some predefined operational area.

Certain Definitions:

Cellular—Wireless communication in any of the generally accepted bands allocated for individual commercial subscriber based voice or data communications.

PCS—Personal Communications Systems (synonymous with 'cellular' for purposes of this invention)

Handset—A mobile device used by a subscriber for voice communication and is a particular type of wireless device. This term is often used interchangeably with wireless device.

Wireless Device—any device be it a mobile wireless device, a portable data assistant or pager that operates on any cellular, PCS or similar system that nominally provides for voice and data communications.

Standards—The governing technical standards describing the operation of certain cellular or other wireless systems.

CDMA (CDMA 2000)—Code Division Multiplexed Access as governed by the TIA TS-95 and IS-2000 standards.

GSM—Global System for Mobile Communications—ETSI standard describing a second generation system for mobile wireless communications.

UMTS—Universal Mobile Telephone System—ETSI standard describing a third generation system for mobile wireless communications.

Collateral Wireless Devices—Any wireless device operating outside of the operational area or approved wireless devices operating in the operational area. Also includes any wireless device that is not a target wireless device.

Beacon—A generic term used for the signal broadcast by a cell tower that continuously provides cell tower and system level information as well as timing so as to aid a wireless device in gaining access to a wireless network. In the present application, beacons are characterized according to a taxonomy which may be found at the beginning of the section Minimizing collateral damage by using override beacons to override control messages in CDMA wireless systems. The present patent application describes two new members of the taxonomy: overriding beacons and catch beacons.

Operational Area—A predefined area in which all wireless devices will be affected by the interrogator.

IMSI—International Mobile Standard Identifier—A unique identifier that is either associated with a specific subscriber or a wireless device used thereby.

TMSI—Temporary Mobile Standard Identifier—A temporary identification number used as local shorthand while the wireless device is operational in a system.

Registration Area—A contiguous geographic region encompassing some number of cell towers. A wireless device will reregister with the cellular network each time it enters a new registration zone so as to facilitate the routing of incoming calls.

MIN—Mobile Identification Number—for purposes of describing this invention, this is synonymous with the "dialed" phone number of a wireless device as opposed to the subscriber identity codes such as IMSI or TMSI. In some standards the MIN and IMSI are de facto synonymous but the term MIN is used when it necessary to refer to specifically the dialed number without regard to standard.

CRC—Cyclic Redundancy Check—A collection of bits that is appended to a packet of data which is used to detect if one or more bits in said packet was erroneously received.

Forward Channel—transmission in the direction from the beacon to the wireless device.

Figure 2:
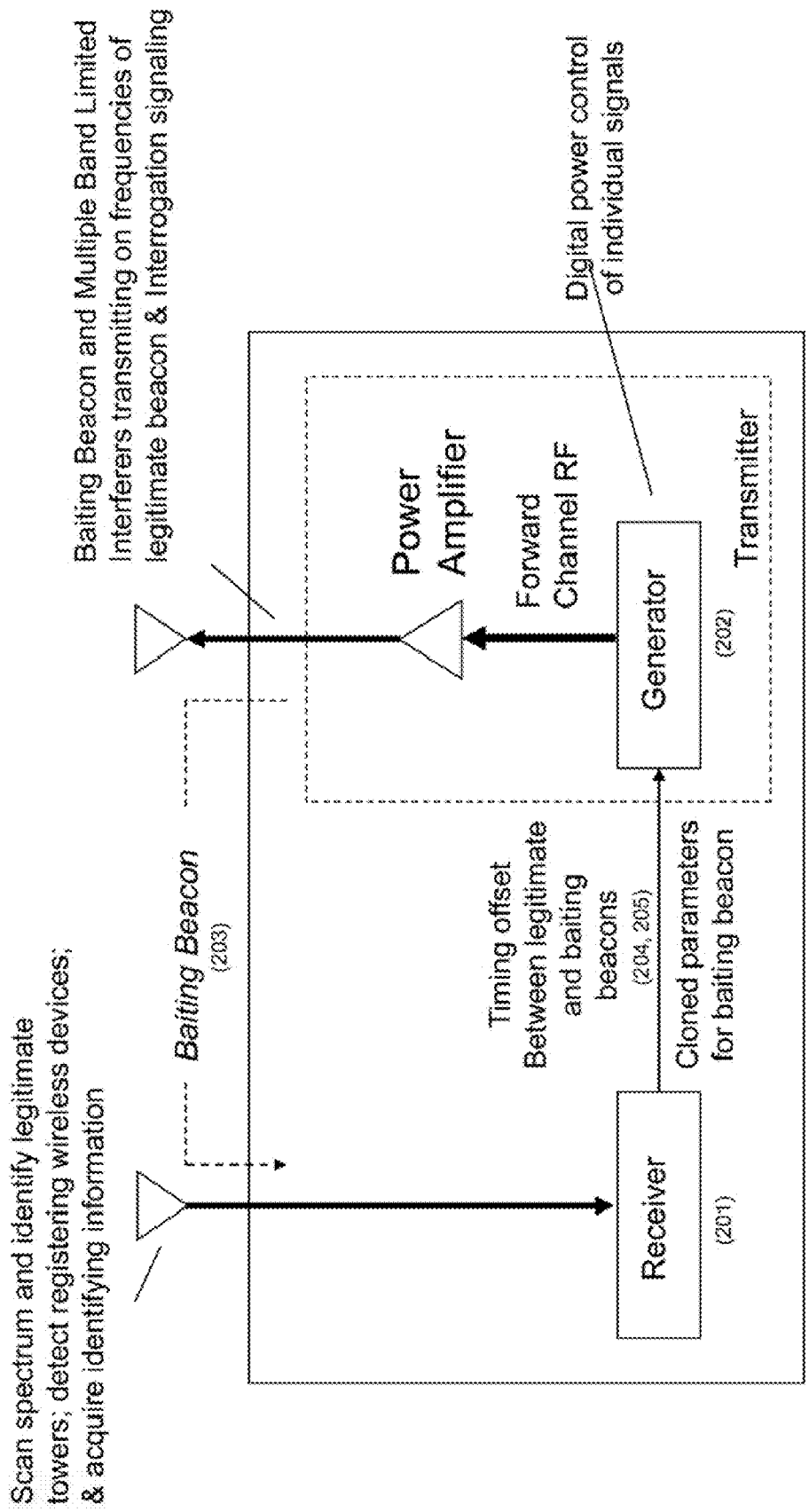
FIG. 2—shows one embodiment of the interrogation transceiver.

General Principles of the Techniques for Baiting, Interrogating, and/or Disabling Wireless Devices While the detailed techniques described herein are specific to the standards under which a wireless device may be operating, the specific techniques for the various standards all share the same core operational premises. These will be described in turn for baiting, interrogation, and disablement. The device which carries out the baiting, interrogation, and disablement operations is called in the following an interrogation system. A preferred embodiment of the interrogation system is shown FIG. 1. The interrogation system consists of a transceiver (101) that is capable of acting as both a baiting beacon and a wireless device. A functional block diagram of the transceiver is shown in FIG. 2. In a preferred embodiment, the interrogation system is made by configuring testing equipment for wireless networks such as the WideFire™ testing equipment manufactured by ComHouse Wireless LP of Chelmsford, Mass., USA. The transceiver first scans the environment in search of beacons (102) that can be detected in some operational area (105). It then transmits some number of interfering signals (103) that are tailored to the signals (102) from the beacons in both strength and bandwidth so as to blind all of the wireless devices present in operational area (105) to the beacons. From the point of view of the wireless device, operational area 105 is determined by the effect of the interference signal on the wireless device. Operational area (105) is shown in FIG. 1 as a circle having some radius from transceiver (101). Other geometries may be obtained by manipulating the placement or orientation of the transceiver or by using directional antennas. By controlling the level of interfering signals (103), it is possible to control the effective radius of operational area (105) from perhaps a few yards (such as container security or baggage screening) to several thousand yards (such as locating wireless devices in a disaster area). The transceiver then proffers a baiting beacon (104) paired with a receiver (not shown) that will entice all wireless devices within some smaller radius (up to and including the whole of the operational area to register (105). By controlling the signal level of baiting beacon (104), it is possible to precisely control the proximity in which wireless devices will attempt to register. When a wireless device registers it can be subsequently interrogated (106) and checked against a friend or foe data base (107). Wireless devices that are not on an approved list can subsequently be acted upon as selected by the operator of the interrogation system. Actions can range from raising an alarm to automatically disabling a wireless device (108). The information in data base (107) enables the system to allow pre-approved subscribers or classes of subscribers to operate unmolested in the operational area while unapproved devices are disabled. An important feature of this technique is that it is not necessary to precisely know the location of the wireless device being acted upon. An example is a prison situation where only the ability to disable a wireless device is required. Data base (107) in this example indicates that the prison staff may carry wireless devices on their persons but that any other wireless device is forbidden and consequently may be disabled (109). If it is desired to know the location of a wireless device, then the interrogation system can force the wireless device to transmit in a quiescent part of the spectrum. The transmissions can then be used to locate the wireless device. An even simpler technique for locating the wireless device is to force it to ring. Further still the wireless device can be interrogated to derive or otherwise facilitate the discovery of secondary information such as encryption keys and/or sequences or the dialed number (known in the art as the Mobile Identification Number—MIN).

A preferred embodiment of a transceiver that implements the interrogation system is shown in FIG. 2. The transceiver consists of a receiver subsystem (1301) and a generation subsystem (1302). The generation subsystem is synchronized to the receiver subsystem through the use of the baiting beacon feedback (1303). The signal broadcast by the baiting beacon includes specially encoded parameters that distinguish it from other beacons but do not affect the behavior of wireless devices. One such parameter is the addition of a message that is not prescribed in the standard that the baiting beacon is obeying. The baiting beacon is turned on at some low power and then the receiver subsystem scans the environment. The receiver automatically detects the baiting beacon as well as all of the relevant beacons in the operational area. The receiver notes the timing differences (1304) between each relevant beacon and the baiting beacon with sub-microsecond precision. The receiver then passes the timing for the relevant beacon differences to the generator along with the parameters (1305) needed to clone the relevant beacon. The generator then clones the relevant beacon and uses the differential timing information to produce the interference signals (103) that suppress the relevant beacon.

Because the timing used to generate the interference signals (103) is based on the difference in timing between the baiting beacon and the beacon to be suppressed, there is no need to take any timing relationships between the receiver and generator into account when generating the interference signals. This completely decouples the receiver and generator and makes it unnecessary to calibrate timing relationships between the receiver and generator.

The high degree of timing precision with which the interference signals (103) can be generated for a relevant beacon makes it possible to suppress the relevant beacon by means of attacks on critical sections of the signaling waveforms produced by the relevant beacon. Among the advantages of being able to attack a critical section of the signal as opposed to the entire signal is a substantial reduction in the average power needed to suppress the beacon. Often, the average power required to attack a critical section of the signaling waveform is several orders of magnitude less than the average power required to attack the entire waveform. This power reduction is particularly relevant with regard to beacons that operate according to standards such as CDMA which are intrinsically resistant to jamming attacks based on noise alone.

A transceiver that may be used to implement baiting beacons and interference signals is the ComHouse Wireless Network Subscriber Test (NST), which may be purchased from ComHouse Wireless LP, 221 Chelmsford St., Chelmsford, MA 01824. The unit is a software defined radio capable of testing both wireless devices and base stations using the GSM and CDMA standards. NST can interrogate wireless devices by acting as a beacon and can scan cellular environments so as to identify and analyze beacons, and can generate multiple simultaneous signals which can be used as interference signals. The interference signals may be customized to surgically attack or manipulate cellular signals with sub-microsecond precision. The unit can also make and receive outgoing and incoming phone calls.

Baiting Overview

When being used to establish a baiting beacon, the interrogation system scans the cellular environment (102) and identifies all of the viable beacons in some defined operational environment. It then clones one or more of the beacons with certain important deviations to create bating beacons while simultaneously generating interfering signals that blind the wireless device to the aforementioned legitimate beacons and thereby forces the wireless device to search for and register with the proffered baiting beacons (103, 104). The baiting beacon is chosen such that it is not on a legitimate channel in the operational or surrounding areas. This makes it possible to distinguish wireless devices that are in the operational area from those legitimately operating outside of the operational area. This is ensured by controlling the power of the baiting beacon such that it is not detectable outside of the operational area by collateral wireless devices. This further eliminates the need for directional antennas to control collateral interference and achieves a solution having the minimal transmitted power and thereby power consumption.

Typical Operation of Wireless Devices

Figure 3:
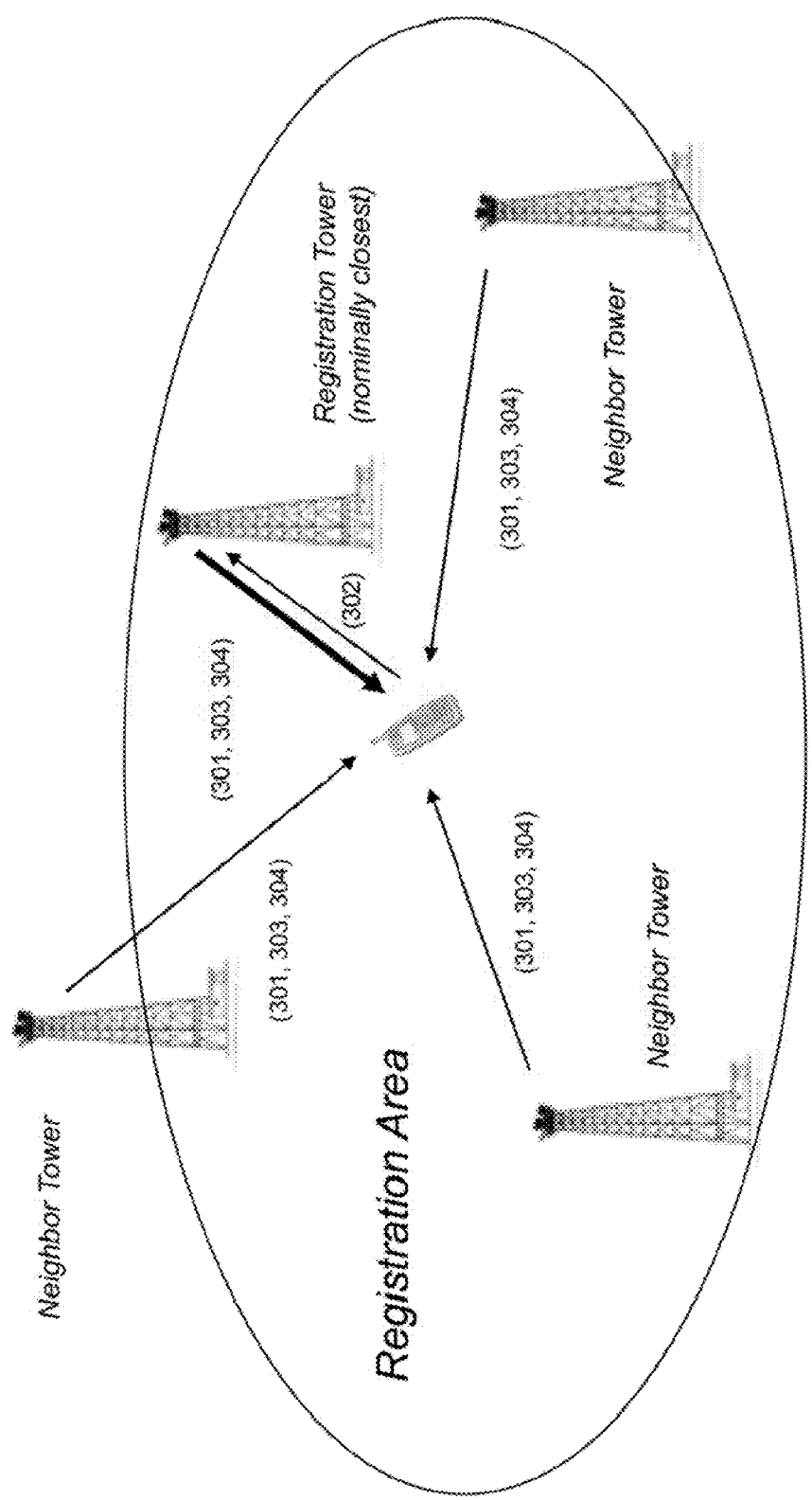
FIG. 3—shows a typical registration operation of a wireless device.

The novelty of this approach to baiting is better understood from a general description of the typical operation of most wireless devices as illustrated in FIG. 3. Upon power up, the wireless device will scan prescribed bands looking for beacons (301). If one or more beacons are identified the wireless device will chose the best beacon (be it for quality, signal strength or compatibility) and attempt a registration (302). The purpose of registration is to indicate to the wireless network that the wireless device is on and therefore able to accept incoming calls or connections. As part of registration, the wireless device identifies a set of neighbor beacons taken from either its own measurements or from a list broadcast by one or more of the beacons (303). The wireless device then enters an idle state where it continues to monitor the beacon on which it is registered for pages from the network that indicate incoming calls or connections (304).

Figure 4:
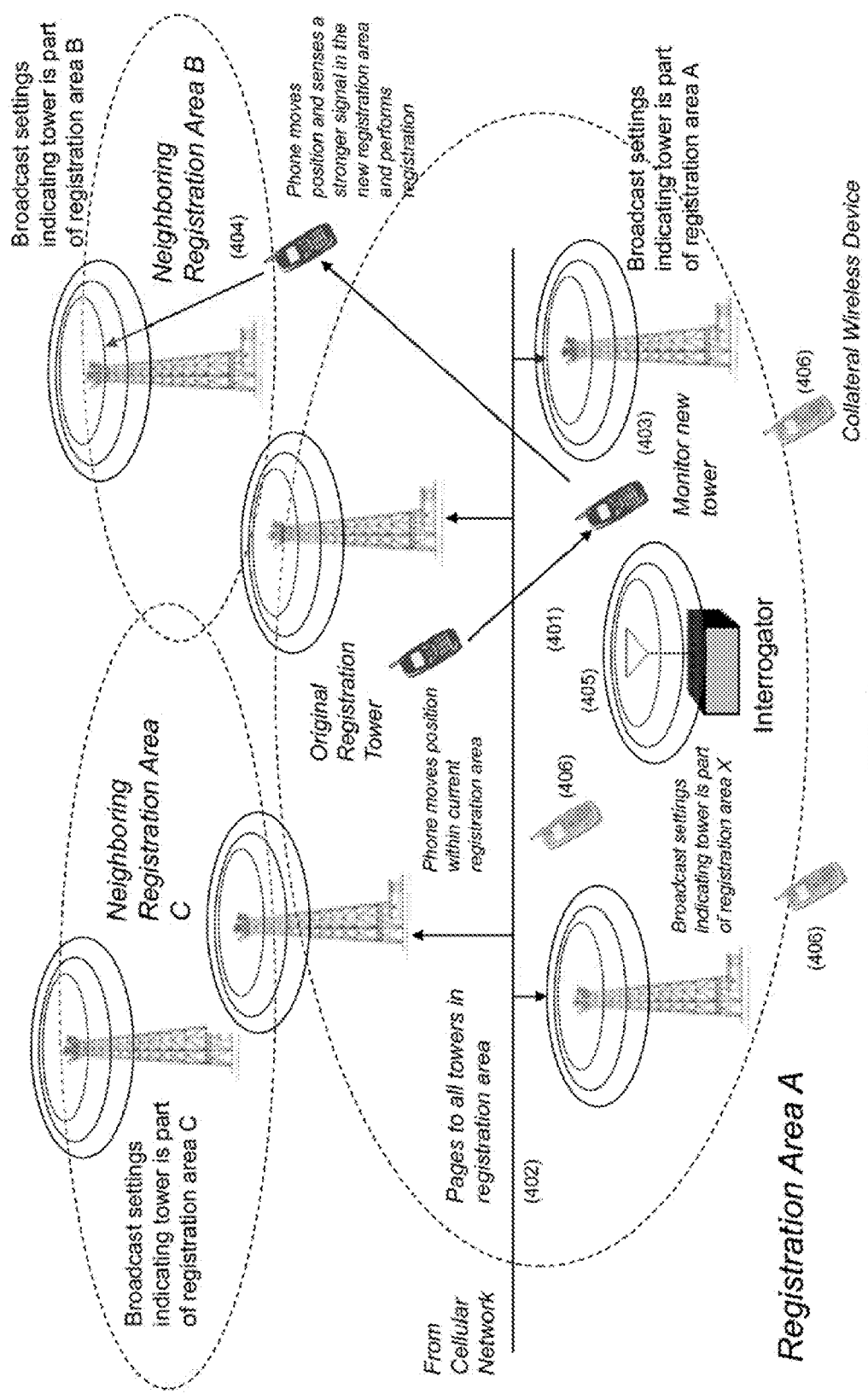
FIG. 4—describes the functionality of registration areas and the general baiting process.

Cellular networks employ the notion of a registration area (referred to variously in the particular standards as a location area or registration zone) as illustrated in FIG. 4. The use of a registration area frees a wireless device from being tethered to the original registration (401) beacon and thereby creates more fluidity for the wireless device to roam. Specifically, a registration area is defined by a set of beacons distributed over some geographic area. All of the beacons in the set have a common identifying code for the registration area embedded in their signals. All pages intended for a wireless device are then dispatched simultaneously to all beacons (towers) belonging to the set of beacons that define the registration area in which the wireless device is currently registered (402). As long as the beacon currently being monitored by the wireless device is one of the set of beacons that defines the registration area the wireless device is currently registered in, the beacon need not be the one that the wireless device originally registered with. The wireless device can thus instead itself determine which beacon to monitor in registration area (403).

Wireless devices can also initiate registration. An example is timed registration, in which a wireless device will automatically reregister with a beacon in the registration area at some periodic interval which is defined by a parameter that is provided to the wireless device by the beacon. However the registration interval is strictly at the discretion of the wireless network and can be both arbitrary and highly variable with periods of tens of minutes or more being typical. Therefore a technique of simply waiting for a wireless device to spontaneously register with a baiting beacon is not viable. Furthermore an interrogation system that worked in this fashion would have to monitor one or more reverse channels associated with each beacon in the operational area. Without the use of highly specific directional antennas or location technology, it is extremely difficult to distinguishing reverse channel message from clandestine wireless devices from those from collateral devices.

Baiting to Force Re-Registration

As described in the overview, the standards prescribe that a wireless device will re-register when it senses that it has entered a new registration area. More specifically when a new beacon is detected from a different registration area that is sufficiently stronger than any beacon in the current registration area, the wireless device will attempt to re-register in the new area (404). A newly-appearing beacon which is enough stronger than an existing beacon that the wireless device attempts to register with it is said to be baiting the existing beacon. In order to keep the wireless device from flip-flopping between registrations when in an area that is on a border between two registration areas, the standards provide for a hysteresis parameter that the beacon broadcasts to the wireless device and indicates to the wireless device how much stronger the new signal must be than any signal which the wireless device is receiving from beacons in the wireless device's current registration area. The hysteresis parameter generally requires that the new beacon signals be many times greater (typical is a factor of 4 to 10) than beacon signals from the current registration are before the newly-appearing beacon can bait the beacon with which the wireless device is currently registered.

A known method of forcing re-registration with a baiting beacon is to make the baiting beacon by cloning a beacon in the registration area, modifying the baiting beacon's registration area identifier, and then provide the baiting beacon with enough signal power to satisfy the hysteresis parameter with regard to the most powerful beacon in the operational (405). The high signal power required to satisfy the hysteresis parameter has two undesirable side effects: the power required to produce the signal and the amount of collateral interference caused by the signal (406) outside the operational area. FIG. 5 presents a spectral representation of the known technique of using a single stronger beacon to bait the wireless devices and contrasts the known technique with the technique disclosed herein for baiting a phone to register in terms of power consumption, time to respond, the inconspicuousness of the attack, and collateral interference.

Figure 5A:
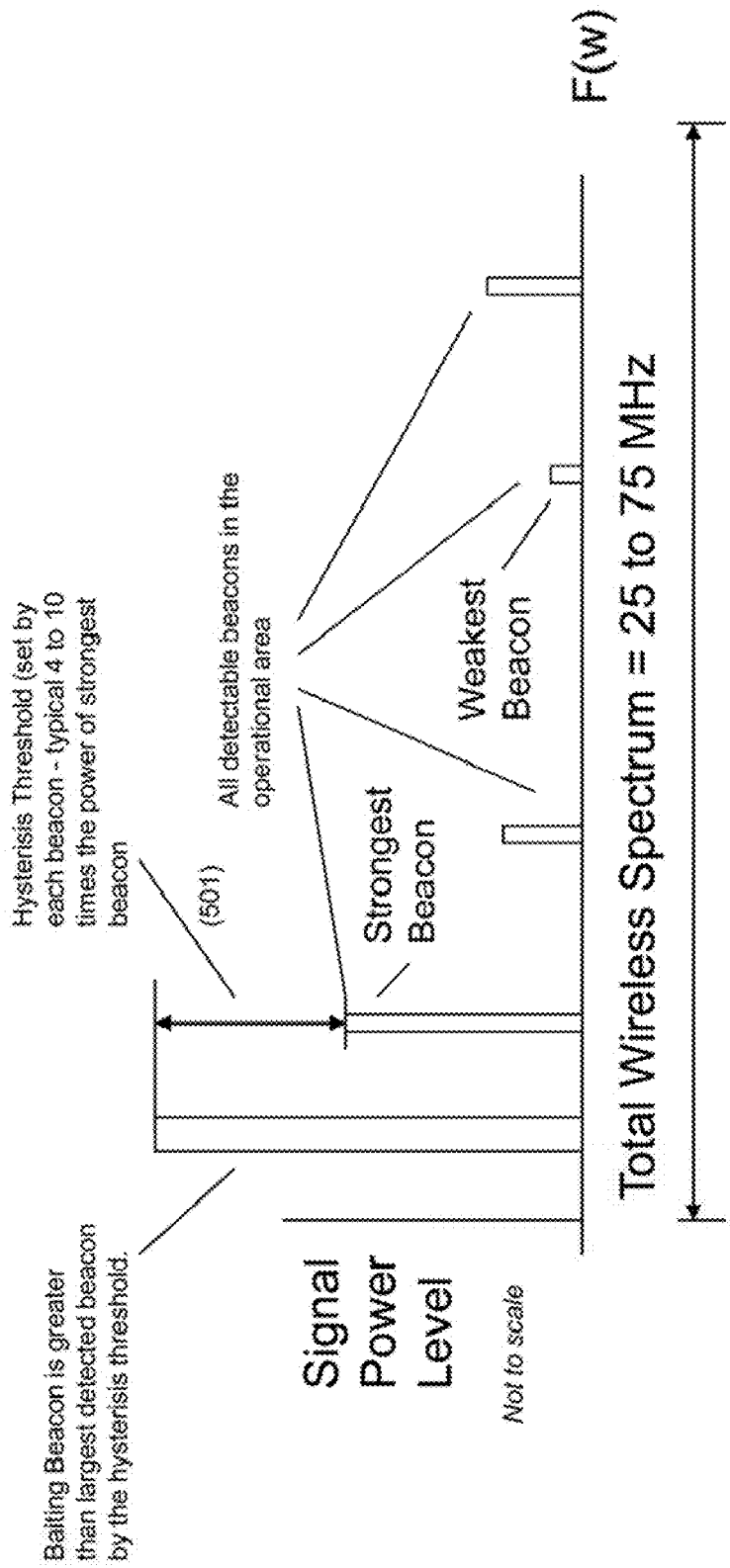
FIG. 5a—shows a spectral representation of a conventional baiting technique.

FIG. 5*a* shows the known technique. The baiting beacon has a signal strength greater than that of strongest legitimate beacon by the hysteresis setting broadcast in the strongest beacon (501). The hysteresis setting typically requires that the baiting beacon be 4 to 10 times stronger than the strongest beacon in the wireless device's registration area.

Figure 5B:
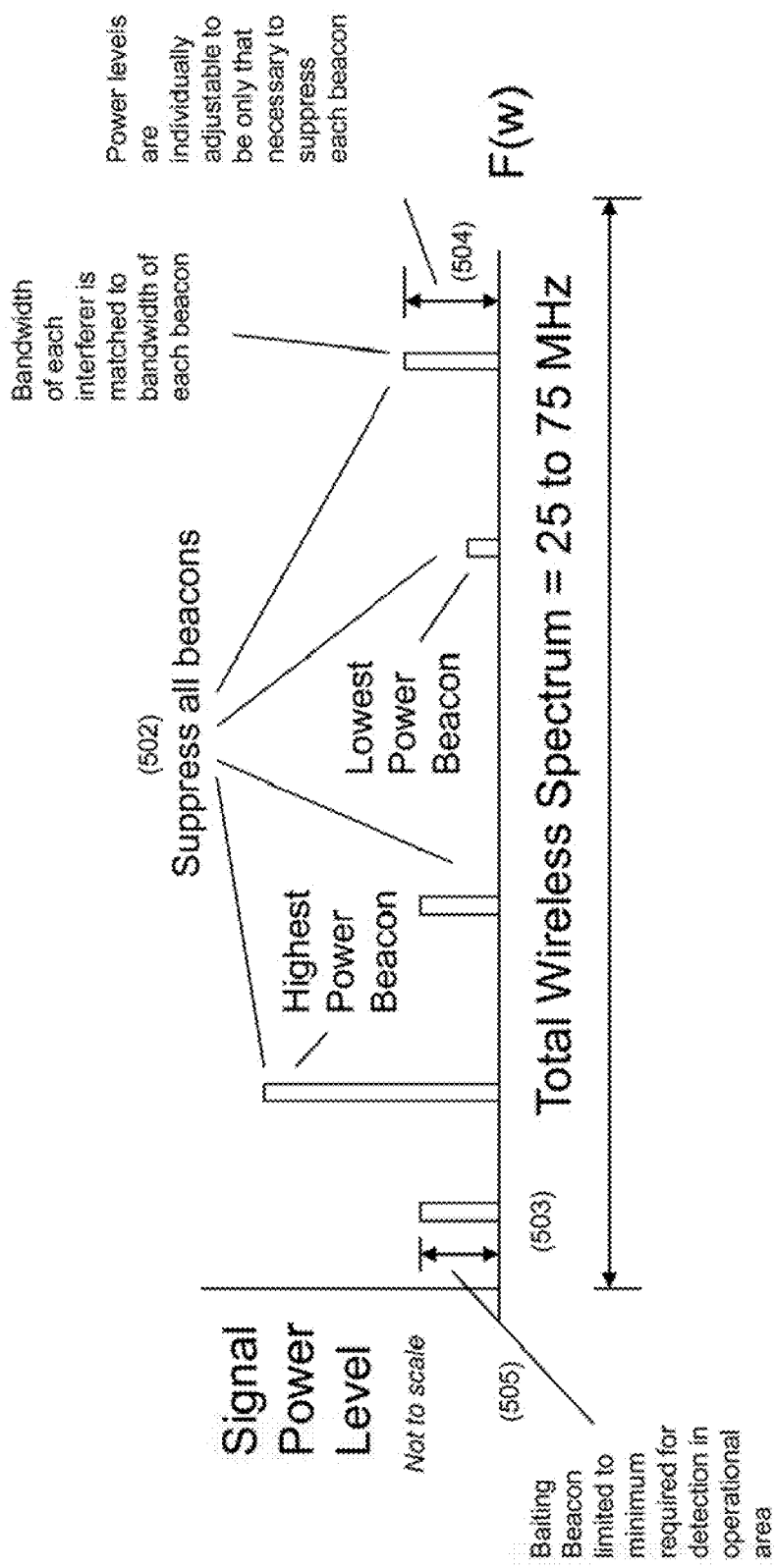
FIG. 5b—shows a new method for forcing a wireless device to register using minimal power and minimum response time while having minimal collateral interference.

FIG. 5*b* shows the technique disclosed herein for surgically suppressing all relevant beacons (502) and then proffering a much lower powered beacon in some quiescent portion of the spectrum (503), preferably but not necessarily using a channel identified as a neighbor of a relevant beacon. Use of a neighbor channel is likely to speed the registration process because it prevents the wireless device from having to rescan the entire spectrum in search of new beacons. Suppressing all of the relevant beacons also prevents the wireless device from simply moving to monitor an unsuppressed beacon in the same registration area. It furthermore decreases the time it takes to force a wireless device to register because when a wireless device is cut off from its network, the wireless device immediately begins searching for new beacons. By contrast, when a baiting beacon is used without suppression, the baiting beacon must be detected for some period of time (perhaps 10s of seconds) as determined by a parameter provided by the relevant beacon the wireless device is monitoring before the wireless device will accept the baiting beacon as viable and attempt to register with it.

Another important refinement of the technique is that the interrogation apparatus automatically adjusts the individual baiting beacon and interference signals to both limit interference with and false alarms from collateral wireless devices. Specifically the power level and bandwidth of an interfering signal which is intended to suppress a relevant beacon may be limited to only that needed to suppress the relevant beacon (504) within the operational area. With all of the relevant beacons thus suppressed, the baiting beacon's power level is adjusted to the minimum required for a wireless device that is within the operational area to respond to the baiting beacon. (505). Power consumption, collateral interference, and false alarms from collateral devices can be further minimized by placing the operational area within a containment housing such as might be used for screening baggage for active handsets that may be used as detonators.

Figure 6:
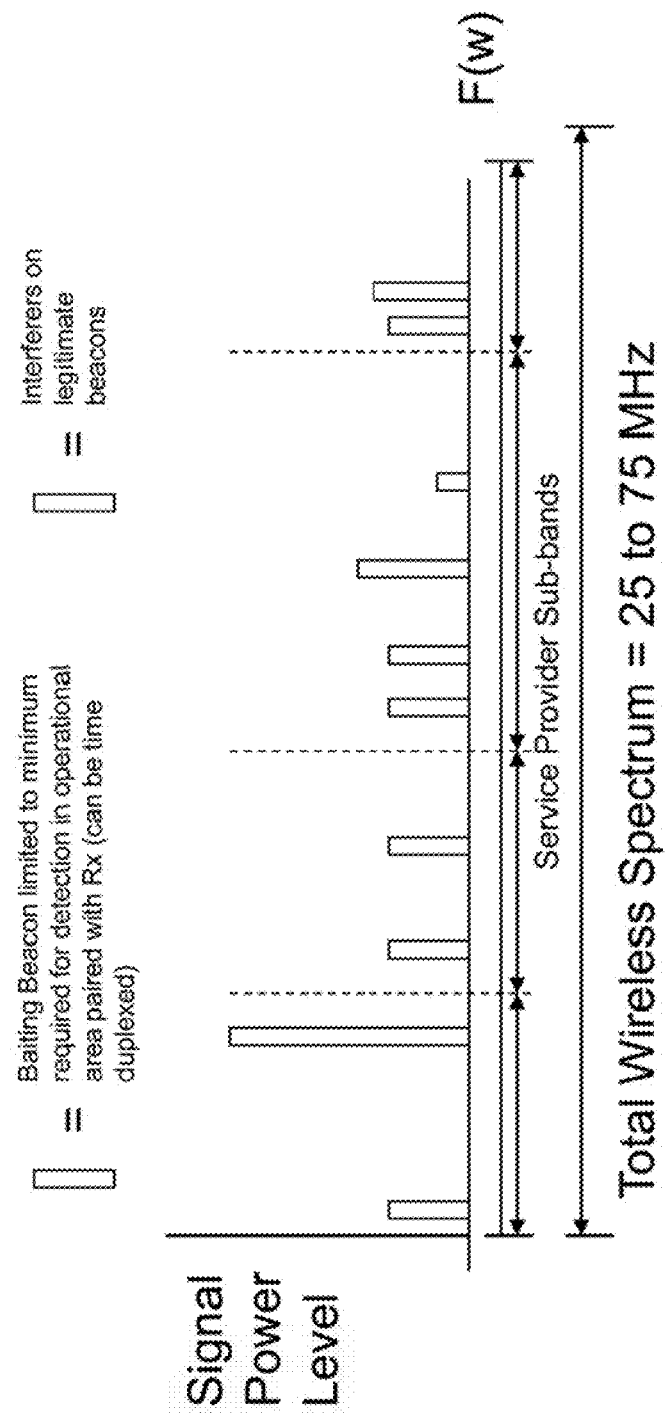
FIG. 6—shows an example of extending the suppression technique to multiple baiting beacons.

Often wireless devices are programmed to only respond to particular beacons as determined by the service provider. Furthermore the cellular spectrum is normally divided into sub-bands. An extension of this technique is thus to provide a baiting beacon corresponding to each relevant beacon belonging to the service provider as shown in FIG. 6. However it is not necessary to do so simultaneously. Instead, a single baiting beacon can be move from one sub-band to another, dwelling in each sub-band for a period that will permit detection of wireless devices that are using the sub-band in the operational area. Detecting all the wireless devices in the operational area will of course take longer when done this way than when done with a baiting beacon corresponding to each relevant beacon.

Interrogation, Herding and Location.

The interrogation system includes a receiver (201) that is paired with the baiting beacon that detects the wireless device as it attempts to register with the baiting beacon (202). The interrogation process also makes use of a data base to store identifying information to create a friend or foe list (107). This makes it possible to filter legitimate subscribers from as yet detected wireless devices that may be of interest and subsequently allow access to the legitimate network of friendly wireless devices (109). This makes it further possible for legitimate subscribers to keep wireless devices on their persons even while in the operational area without provoking false alarms.

Wireless devices that are enticed to register with the baiting beacon can be subsequently interrogated to determine whether they are friend or foe (104). The interrogator uses the paired baiting beacon and receiver to interact with the wireless device as it attempts to register so as to elicit identifying information such as the mobile identification number (i.e., the wireless device number), the international mobile subscriber identity IMSI, the temporary mobile subscriber identity TMSI or the serial number. The concept can be extended further to entice the wireless device to transmit continuously and possibly be sequestered on a unique channel so as to facilitate its location. A further extension of the concept is to use the neighbor beacon list obtained from the relevant beacons on the initial scan to find a quiescent channel. The baiting beacon then forces the wireless device of interest to move to this channel and to transmit on demand. In some situations it may even be desirable to force the wireless device to ring.

Figure 5C:
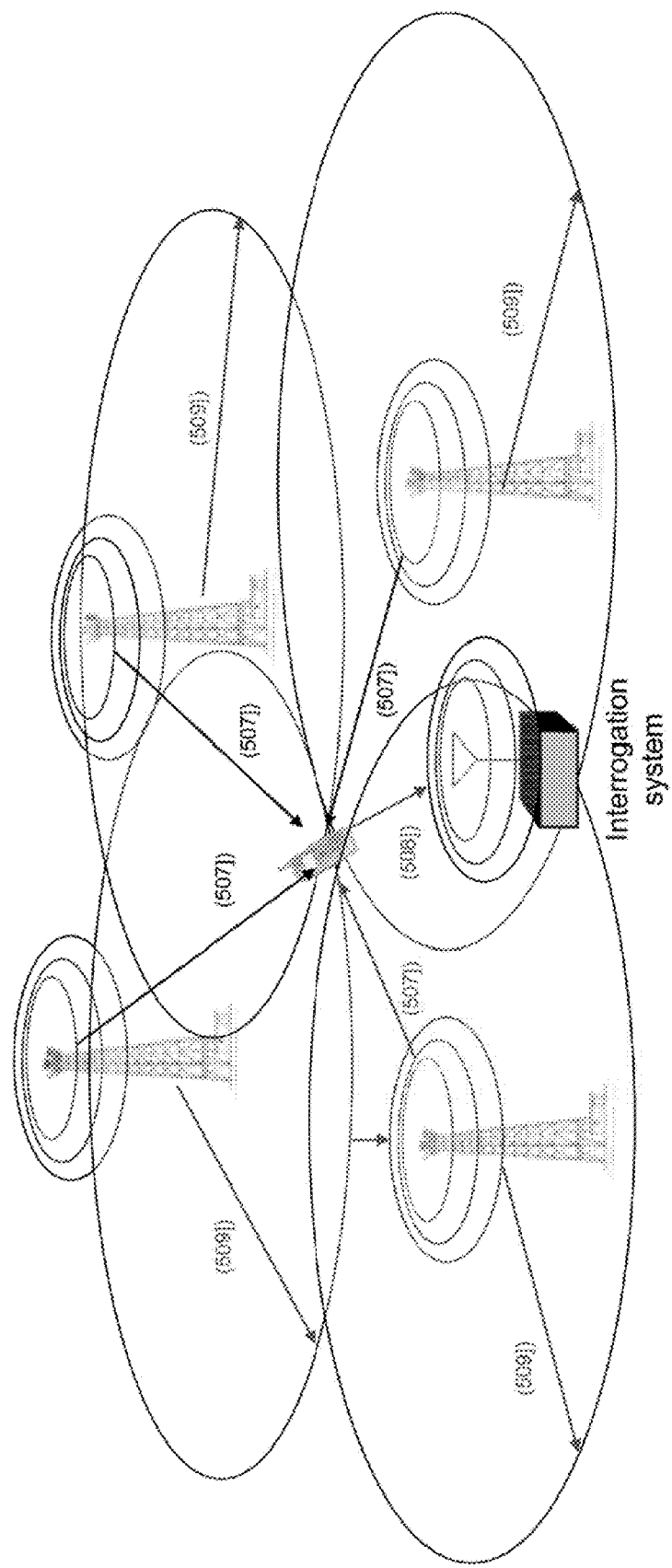
FIG. 5c—shows a method of locating a wireless device as part of the interrogation process.

Once the baiting beacon is interacting with a wireless device, it is also possible for the interrogation system to compute approximate location of the wireless device, as shown in FIG. 5c. Specifically the standards specify that a wireless device continually scan all of its neighbors (507) while it is actively communicating with the current serving tower and to insert regular measurement reports on the absolute signal strength of the beacons as received by the wireless device. This information is then passed on to the network for purposes of determining when a phone should be handed off to another tower. If the wireless device is indicating to the network that it can sense a tower with much better signal strength and/or quality, the network will direct the wireless device to move to said tower. This is known in the art as Mobile Assisted Hand-Off (or Hand-Over)—MAHO. The wireless device of course offers these reports to the interrogation system's baiting beacon (508). If a user of the interrogation system knows the location of the neighboring towers (presumably from a previous survey), it is possible to derive, or as a minimum narrow, the position of the wireless device based on these power measurements as shown in FIG. 5c. During the period in which the wireless device is collecting data for a measurement report, the interference signals are turned off so that the wireless device can detect the relevant beacons and the baiting beacon is given a signal strength sufficient to prevent the wireless device from monitoring another beacon. Specifically the received power implies a distance to the tower (509). Therefore if a circle is drawn around each tower, the circle having a radius which is a function of the detected signal strength reported by the wireless device, the wireless device will be located at or near the intersection of the circles. The location technique may be further refined by using sector orientation and aperture information from the surrounding legitimate beacons. For example, a tower survey is likely to include not just the frequency channel settings and the position of the tower but also the orientation and aperture (beam width) of the sectors mounted thereupon (e.g., pointing with respect to true north and aperture in degrees—typically 120 degrees out of 360 for a three sector tower). The location of the wireless device is therefore refined by overlaying on a map the projections of the sectors that can be heard by the wireless device with the intersection of said being the presumed area in which the device is transmitting.

Disablement

Wireless devices that are deemed to be foes can subsequently be quarantined or temporarily disabled. All standards provide for dealing with a malfunctioning wireless device by having the beacons in the registration area issue a command to the wireless device to which the wireless device responds by disabling itself until it is power cycled. The baiting beacon can use this command to disable wireless devices in the operational area.

In other cases, wireless devices can be disabled by irradiating them with large signal levels in the frequency band in which such devices are known to operate and thereby tripping protection circuitry that can only be reset by power cycling. The technique is further refined by either matching the bandwidth of the interferer to the operational bandwidth of the device so as to concentrate the energy and then sweeping this energy across the operational band over time or detecting the frequencies on which the cellular or paging systems are operating in the operational area and concentrating the energy in those channels. This technique is particularly useful for disabling strictly passive wireless devices such as one-way pagers that cannot be interrogated. Furthermore collateral interference is controlled by controlling the tripping signal power so that only devices within the operational area will be affected. One example is baggage screening where the apparatus operates in close proximity to the wireless device. Collateral interference may be further limited by the use of either radio-opaque containers or directional antennas.

Determination of the MIN

In the case of wireless devices that operate according to the GSM standard the interrogation system can hijack the device and make a phone call on the network and use the network's caller ID functionality to detect the calling number of the wireless device.

Standard-Specific Methods

CDMA and CDMA 2000

CDMA is governed by two published standards: CDMA (TIA/EIA IS-95 A/B) and CDMA 2000 (TIA/EIA IS-2000), which are known in the art. These standards are hereby incorporated by reference into the present patent application. The two standards are indistinguishable for purposes of the present discussion except where the baiting beacon is required to be specific to the standard. Both are therefore collectively referred to as CDMA. A preferred embodiment of the interrogation system deals with IS-2000 beacons and wireless devices by suppressing all IS-2000 beacons and forcing IS-2000 wireless devices to fall back to an IS-95 baiting beacon. This simplifies the complexity of the interrogation system. Other embodiments of the interrogation system may, however, use both types of beacons simultaneously if there are features in the IS-2000 beacon that can improve the detection and/or location of wireless devices.

Figure 7:
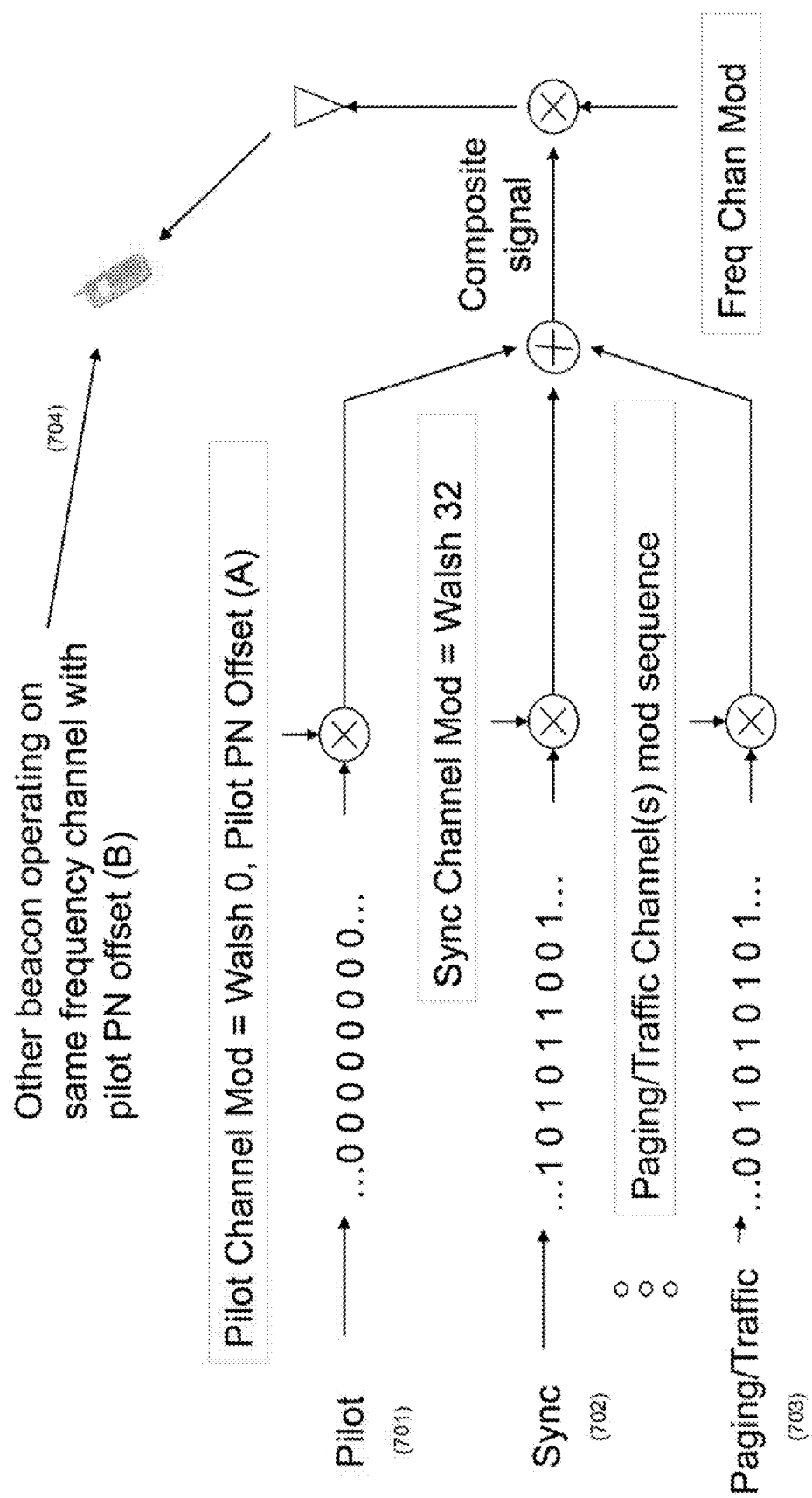
FIG. 7—shows a simplified representation of a CDMA forward channel signal.

CDMA signals use a direct sequence spread spectrum modulation technique to allow multiple beacons and wireless devices to simultaneously share RF spectrum. The signal for each wireless device is distinguished by modulating the signal with a unique orthogonal time coded sequence. A simplified representation is shown in FIG. 7. The times used for the time sequences are synchronized directly to the Global Positioning System (GPS). The synchronization permits sub-microsecond time coding.

The signal produced by the CDMA beacon operating on the forward link includes a pilot (701) and sync channel (702) and some number of paging and traffic channels (703) all operating on the same frequency channel but distinguished by different code sequences as shown in FIG. 7. When the wireless device powers up, the wireless device searches a set of programmed RF operational band(s) for the pilot channel of a beacon. The wireless device will then use the pilot channel to acquire the sync channel. Using the information in the sync channel, the wireless device synchronizes itself to the timing of the beacon and then extracts a set of messages, known in the art as "overhead" messages, that the beacon repeatedly broadcasts on the first paging channel. These messages are used by the wireless device to identify the network on which the beacon is operating as well as to receive parameters for the behavior of the wireless device when interacting with the network from the beacon. The parameters include how to formulate access probes to gain access to the network.

An important feature of the forward CDMA channel is that all of its code channels are based on the pilot code channel, which is in turn expressly locked to GPS. Consequently, in order to employ any given code channel, the wireless device must necessarily synchronize to the pilot. Furthermore, several beacons can share a CDMA channel simultaneously (704). Each of the beacons synchronizes to a different part of the pilot (specified by the pilot PN offset for the beacon).

Baiting and Suppression

Creating Baiting Beacons

As a first step in suppressing the relevant beacons in the operational area, receiver subsystem (201) of the interrogation system will perform a scan of the environment in the operational area and analyze the relevant beacons. Receiver subsystem (201) then sets up the generation subsystem (203) so that it generates a baiting beacon at some signal level on some frequency channel with some pilot PN offset. The baiting beacon's parameters will normally be set to make it a clone of the most conspicuous existing beacon. The baiting beacon will be slightly modified so that it appears to be in a different registration area from that of the beacon the baiting beacon was cloned from. There may also be other parameter settings in the baiting beacon that maximize the conspicuousness of any wireless devices that register on the baiting beacon. The baiting beacon also has some additional feature which enables the interrogation system's receiver to recognize the baiting beacon as such. Examples of such features are:

including a special code in a message which the standard requires the beacon to transmit. The special code may be either unexpected or impossible on the networks seen in the operational area; or introducing a nonstandard or obsolete message. Because the message is non standard or obsolete, it is ignored by the wireless devices.

After the baiting beacon has been set up, the receiver repeats the scan. This time, it picks up the relevant beacons as well as the baiting beacon. The receiver then computes the timing differences between the baiting beacon and the relevant beacons using any available signal processing techniques for doing so—such as direct or indirect signal cross-correlation and subsequent demodulation.

Figure 8:
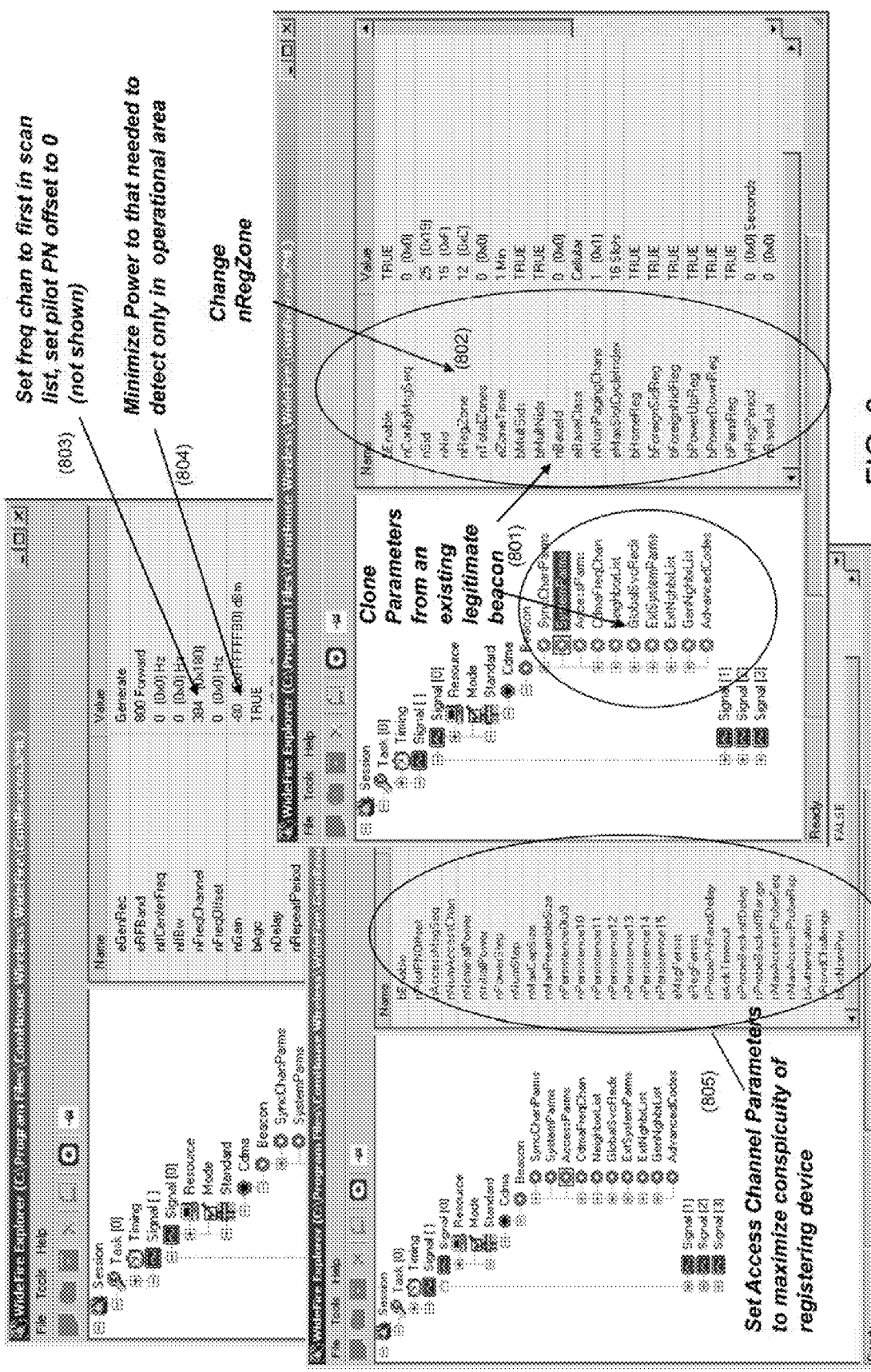
FIG. 8—shows an example of using commercially available test signal generation equipment and the associated beacon settings that are used to bait a CDMA wireless device.

FIG. 8 shows an example of using WideFire® Dragon series test equipment to create a baiting beacon. A description of WideFire Dragon series test equipment was published in July 2006 on the website of ComHouse Wireless LP. The baiting beacon is created from a clone of an existing beacon (801) with a few modifications such changing the registration area (802) and then set to be on a desired channel (803) at a signal level that is set such that it can only be detected in the operational area (804). Other parameters can be set to increase the conspicuousness of the registering wireless device. For example, the parameters that specify the duration and signal strength of an access probe from a wireless device to the beacon can be selected to maximize the duration and signal strength (805).

Figure 9:
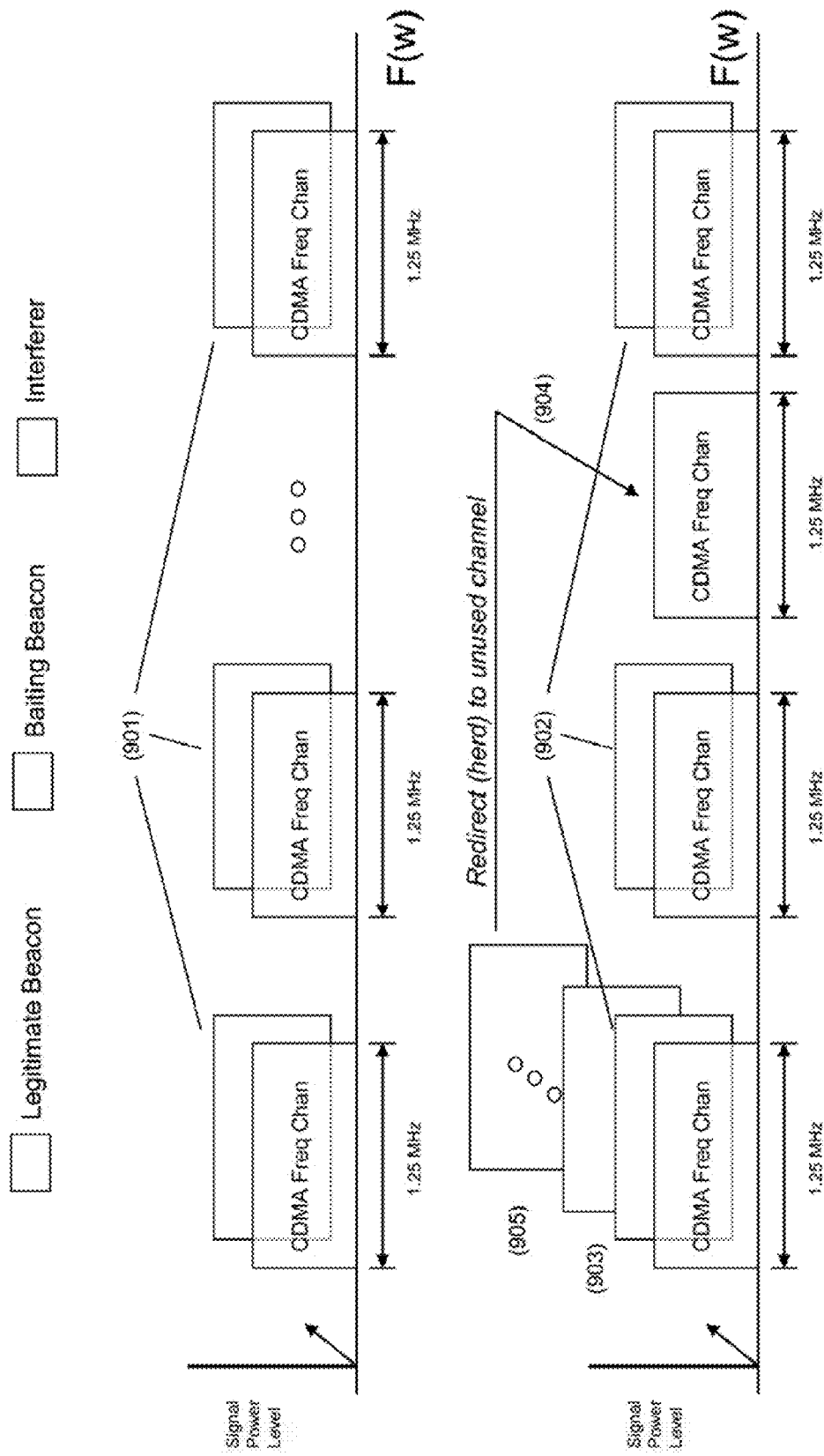
FIG. 9—shows methodologies for creating and placing both baiting beacons and interferers.

FIG. 9 shows two possibilities for the placement and nature of interfering signals and baiting beacons. As shown at 901, the interfering signals can be produced by artificial beacons having a different pilot PN offset from the PN offset of the relevant beacons. This arrangement baits the wireless devices on all of the frequency channels used by the relevant beacons simultaneously (901). However this method is inferior to that proposed in the interrogation system because the receiver must monitor all of the back channels associated with the beacons to detect registration attempts. Making a receiver that does this is much more complex and expensive than making a receiver that only modifies the forward channels. Instead, the interrogation system uses interference signals to force all the wireless devices in the operational area to register on a single baiting beacon operating on a single frequency channel (902).

A preferred location for a beacon in the spectrum is on the lowest unused pilot PN offset on what is the generally the first channel in the particular network that is scanned by the wireless device in the particular network. If the first channel to be scanned is occupied by an existing legitimate beacon then the baiting beacon can transmit at a level such that it acts as both an interferer with regard to the legitimate beacon and a baiting beacon (903). Operating on the first channel to be scanned minimizes the time the wireless device requires to register with the baiting beacon, but other channels could be used as well.

In some cases the interrogation system will choose to bait on an unused channel so as to eliminate any co-channel interference intrinsic to CDMA and thereby simplify the process of subsequently locating a wireless device that is operating on the unused channel by using techniques such as direction finding, angle of arrival or time difference arrival (904). Specifically the CDMA standard provides for configuring a beacon such that a wireless device that attempts to register with a beacon in the wireless device's registration area signal is redirected to another beacon for registration. In this technique, the interrogation system provides two baiting beacons—a first baiting beacon for baiting devices in the operational area and a second baiting beacon that operates in a quiescent portion of the spectrum. The first baiting beacon redirects the wireless device to the second baiting beacon. In one embodiment of the interrogation system, how the baiting beacons are placed is up the user of the interrogation system. If the user does not specify the placement, the interrogation system provides a default placement for the baiting beacons.

It may be necessary to generate several baiting beacons simultaneously to address cases where a particular wireless device is programmed with a preset list known in the art as the preferred roaming list (PRL). Some scenarios may call for a cloned baiting beacon corresponding to each wireless service provider whose beacons are is detected in the operational area and one or more additional baiting beacons that are designed to be as general as possible to snare wireless devices that are completely foreign to the operational area. This problem is addressed by simply introducing one or more additional baiting beacons that operate on the same frequency channel but have different pilot PN offsets. This minimizes the multiple frequency channel monitoring problem by placing all the beacons on the same frequency channel (905). Another possibility previously described is to duplex the beacon across the provider sub-bands.

Interfering Signals

Any class of interference signals will work to cause a wireless device to reregister with a baiting beacon as long as the interference signals prevent the wireless device from detecting the signal of a relevant beacon. This is shown at (1001) in FIG. 10a. Examples of interference signals that will work are simple white noise or a modified CDMA signal that uses illegal code sequences. CDMA signals are, however, inherently resistant to jamming. Because this is so an indiscriminant jamming signal such as white noise centered upon the same frequency and having the same bandwidth as a relevant beacon that is to be suppressed must have a signal strength in the operational area that is on the order of 100 times the signal strength of the relevant beacon in the operational area. The signal strength necessary for indiscriminate jamming is a particular problem when legitimate beacons are operating at high power and in close proximity to the operational area.

The interrogation system is able to generate interference signals that require no more power to suppress a relevant beacon in an operational area than the power of the relevant beacon's signal in the operational area. The interrogation system achieves this by limiting the bandwidth of the interfering signals to that of the relevant beacon and attacking only critical sections of the waveform within the bandwidth (FIG. 5). By limiting the attack to only critical sections of the waveform, the interrogation system minimizes the transmit on-time of the interfering signal and thus significantly reduces the average power required to suppress the relevant beacon. Matching the bandwidth and power level of the interfering signals to the bandwidth and power levels of the relevant beacons also hides the interfering signals within the waveform produced by the relevant beacons, making the interfering signals hard to detect. Where it is necessary to hide the interrogating system so that its location cannot be detected and countermeasures cannot be employed against it, the transmit on-time may be randomized.

Figure 10A:
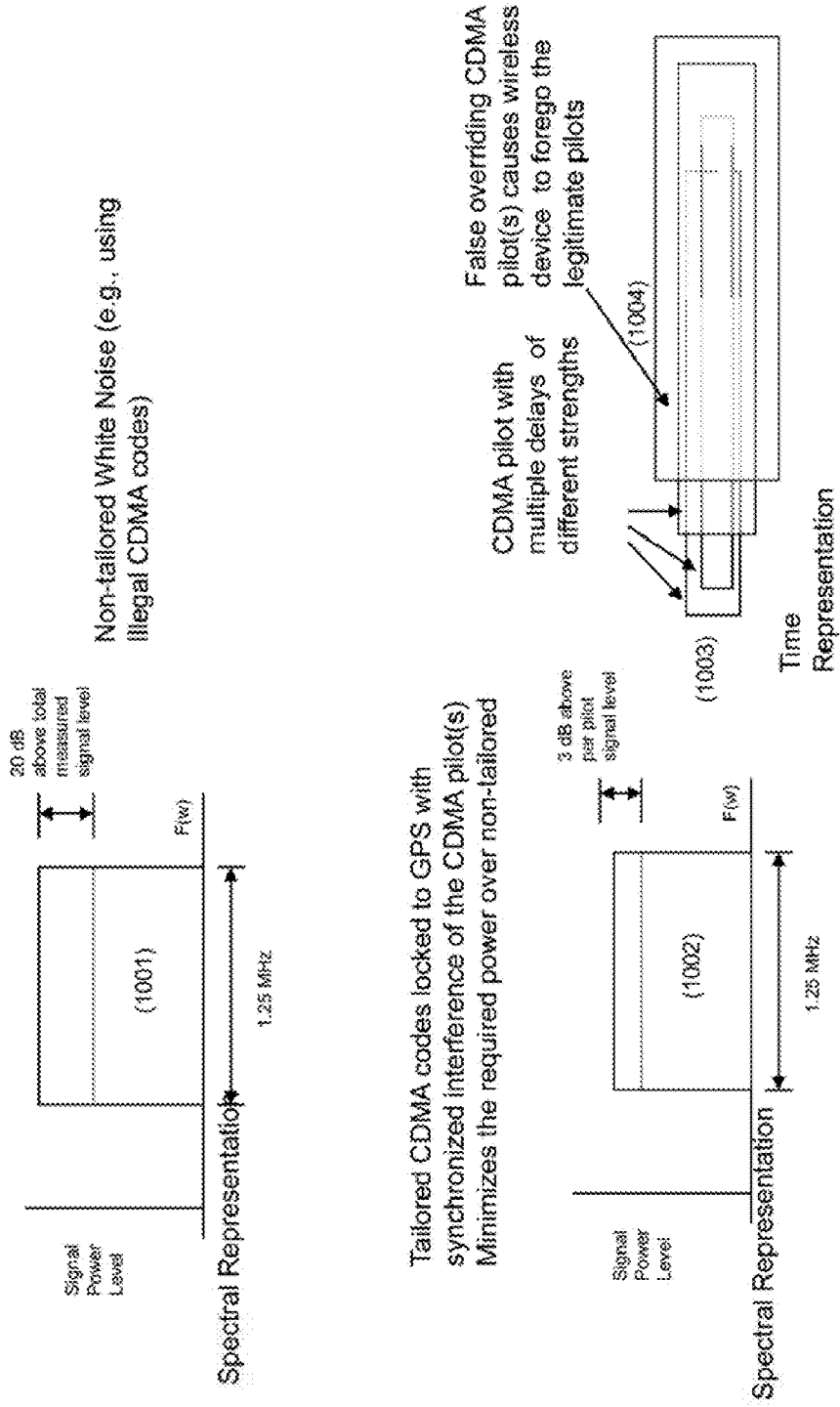
FIG. 10a—shows examples (non-exhaustive) of surgical CDMA interfering signals which minimize power consumption and conspicuity.

FIG. 10a shows several different examples of the types of interfering signals that may be used by the interrogation system to suppress CDMA beacons. Because the interrogation system is precisely synchronized to the relevant CDMA beacon (FIG. 2) it is possible to perform a direct attack on the relevant beacon's pilot signal by proffering an interfering pilot signal with false delays that are either slightly advanced or slightly retarded with respect to the relevant beacon's pilot signal but still close enough to the timing of the relevant beacon's pilot signal for the wireless device to lock onto the false pilot signal rather than onto the relevant beacon's pilot signal (1002, 1003, 1004). Because the timing from the pilot signal is used by the wireless device to interpret the remaining portions of the signal from the relevant beacon, a wireless device that is locked onto the false pilot signal cannot interpret any of the signal from the relevant beacon. The interfering pilot signal thus forces the wireless device to lose contact with its network, and that in turn forces the wireless device to reregister with the baiting beacon. This has the distinct advantage that the interfering pilots need only be slightly larger in signal strength than the legitimate pilots as received by the wireless device (1002, 1003, 1004) instead of the previously mentioned 100 fold increase in signal level required by a non synchronized white noise attack (1001).

Figure 10B:
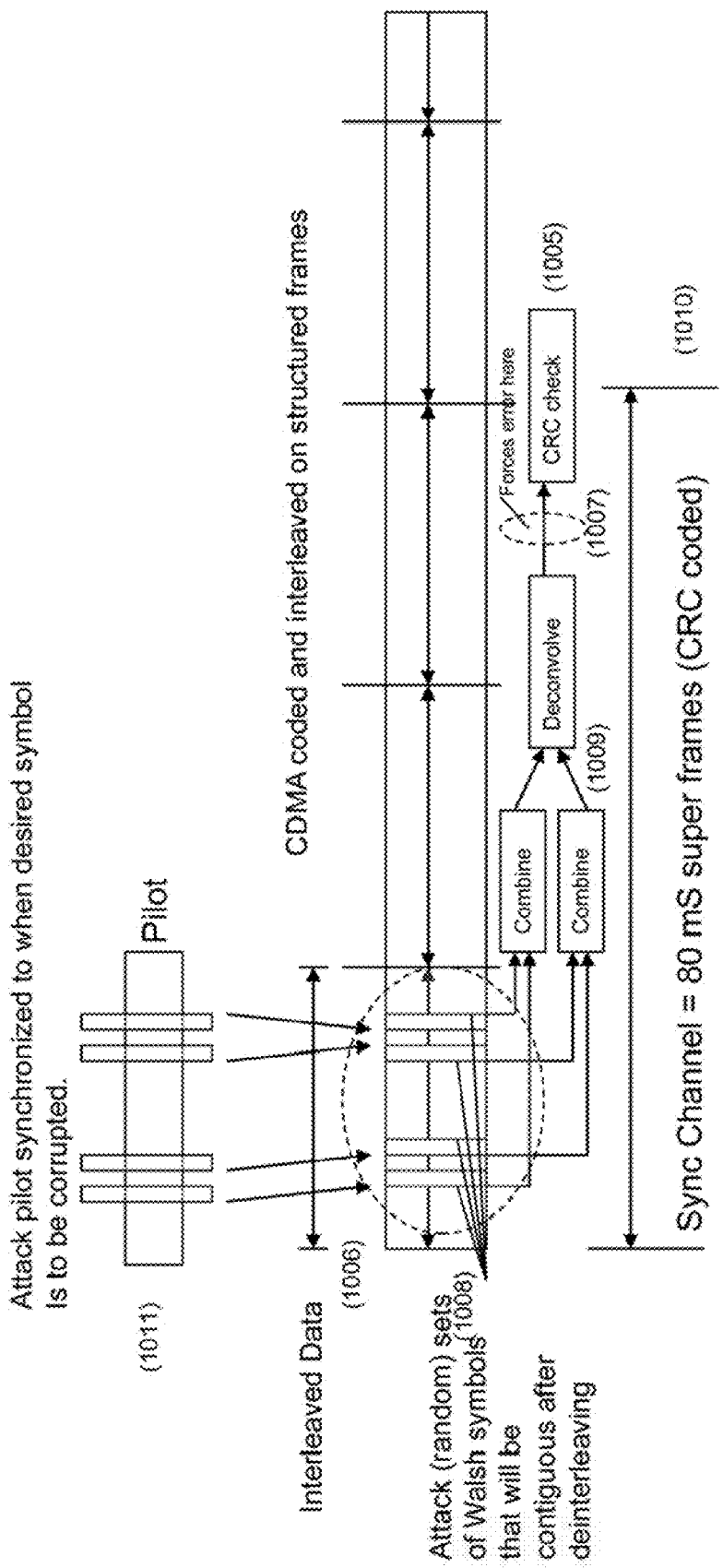
FIG. 10b—shows specific example refinements of surgical CDMA interfering signals which minimize power consumption and conspicuity.

Another possible attack, expressed in FIG. 10b, is to recognize that all CDMA channels (such as the sync channel) use cyclic redundancy checks (CRCs) and convolutional encoding (1005) to deal with errors in the data represented by the signal. A CRC indicates whether data in a portion of the signal termed a CRC checking span is valid. Associated with the convolution encoding process is data interleaving. Cellular interference tends to occur in bursts instead of being uniformly spread over time. The purpose of data interleaving is to shuffle the data symbols prior to transmission so that when they are subsequently deinterleaved at the receiver, any bursts of errors introduced in the transmission channel will tend to be distributed over time instead of occurring in contiguous bursts. The intent of interleaving is to improve the performance of the deconvolution process (an example of which is the Viterbi algorithm) (1006) that is well understood in the art to perform best when errors are more or less uniformly distributed over time instead of occurring in sets of contiguous symbols. However, the deconvolution process diminishes rather than improves the demodulation performance when errors occur in contiguous bursts in the pre-deconvolved data, as it makes it more likely that the trellis path decoding will forsake the expected traceback path in favor of a competing traceback path and thus cause the receiver to completely corrupt the decoded signal (1007).

Contiguous bursts of errors in the deconvoluted data can be produced by attacking the pre-deinterleaved symbol sequence at seemingly disparate but in fact deliberate places that are matched to the interleaving process (1008). The attack introduces errors into the post-interleaved symbol sequence at the locations that are related by the interleaving process such that when they are subsequently deinterleaved by the receiver, the errors occur in contiguous bursts (1009). Selection of particular interleaved candidate symbol sets is not generally important and therefore this technique lends itself to randomization of the attack within any given frame, which further disguises the attacking signal. Moreover, not every frame of the beacon's signal need be attacked. Instead merely successfully attacking a single frame within the total CRC checking span (1010) is generally sufficient to force the intended CRC error. Because this is the case, frames can be randomly selected for attack. In the former instance, this leads to a further reduction of on-time and therefore required power and in the latter instance, further reduces the conspicuousness of the attack.

Symbols in the sync code channel can be directly attacked by generating interfering symbols that are coded to that channel. Another possibility is to attack the symbols indirectly by corrupting portions of the pilot signal (1011) upon which the sync code channel is synchronized for the duration of the symbol that is being attacked. As a result of the attack on the sync code channel, the synchronization required to correctly read the symbol is disturbed and the wireless device reads the symbol incorrectly. Either form of attack causes enough post deconvolution bit errors that the CRC for the checking span to which the packet belongs to indicate that the packet is bad and thereby cause the wireless device to drop or otherwise ignore the packet and any message to which the packet belongs. Again, only a relatively small number of post-interleaved symbols on a reduced subset of frames need be attacked, and the power requirements for the interrogation system are correspondingly small.

Obtaining Identification Information from the Wireless Device

In the interrogation system, a receiver is paired with each bating beacon. The receiver looks for registration bursts from wireless devices. In the CDMA standard, these registration bursts are termed access probes (FIGS. 1 and 2). Many properties of a wireless device's access probe are controlled by parameters which the wireless device receives from the beacon it is monitoring. Every access probe contains information that identifies the wireless device making the access probe. Proper parameter settings in the beacon can force the wireless device to provide identifying information that uniquely identifies the wireless device. Examples of information that uniquely identifies the wireless devise are the device's IMSI or ESN.

Since no single access probe from a wireless device contains all of the access information which may be retrieved from an access code, the interrogation system uses a two or perhaps three pass process in which the wireless device is forced to reregister itself with a number of baiting beacons, each one having parameters that require the wireless device to return a different part of the information in the access probe to that baiting beacon. More specifically, each baiting beacon broadcasts an access parameters message which indicates the identifiers for the wireless device which that baiting beacon desires to receive from the wireless device. In other embodiments, each wireless device may be expressly interrogated as it is detected by the baiting beacon to gain the identification information.

Herding Wireless Devices

Figure 11:
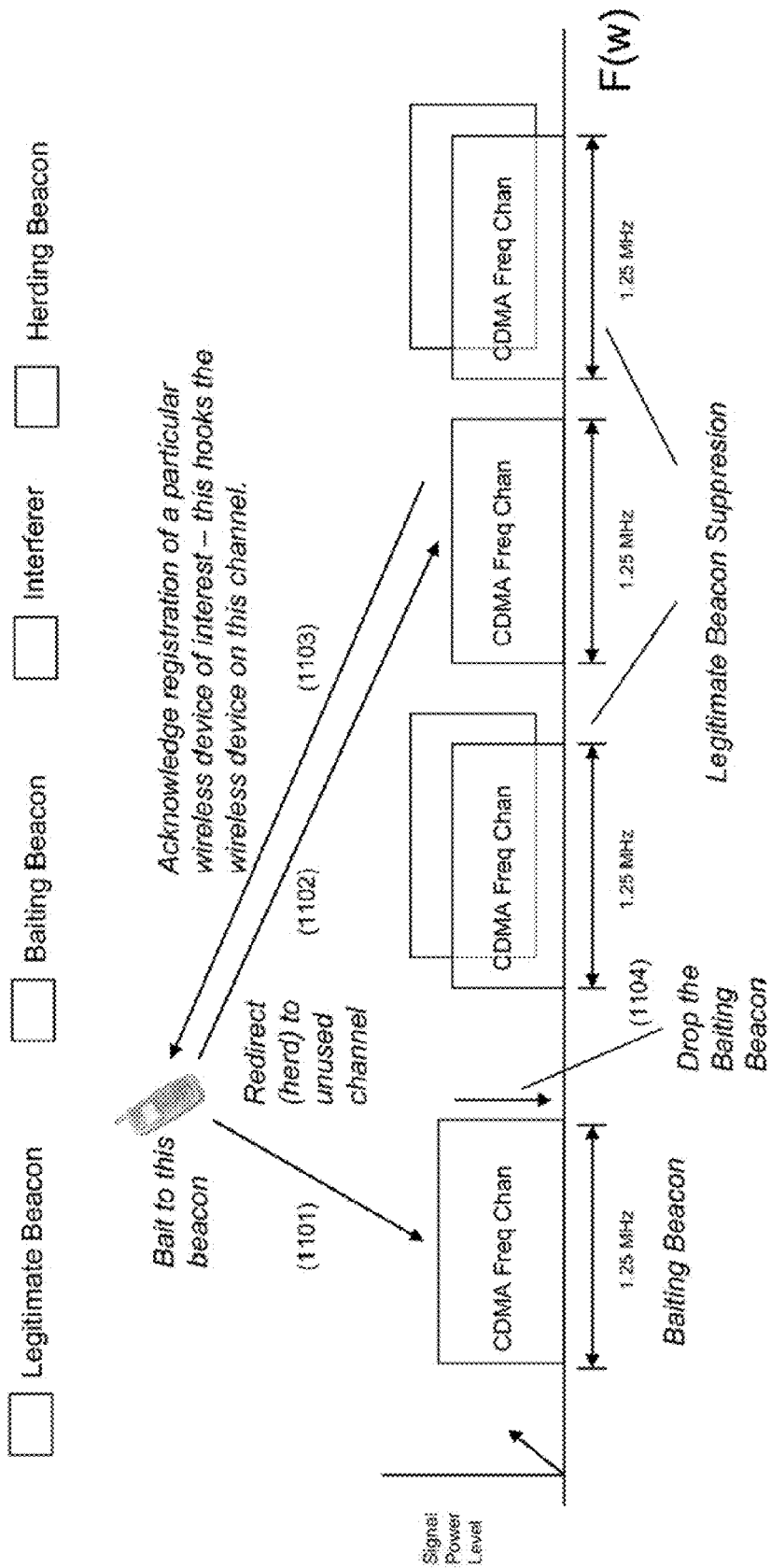
FIG. 11—shows methods for herding of a CDMA wireless device.

The interrogation system can use messages from the baiting beacon to a wireless device to cause the wireless device to operate on an otherwise unused channel. The technique of causing the wireless device to operate on the unused channel is termed herding. Herding is shown in FIG. 11. If the herded wireless device is the only wireless device operating on the unused channel, location of the herded wireless device from the signal it broadcasts becomes dramatically easier. A CDMA wireless device can baited as described previously (1101) and then subsequently herded to attempt access on yet another baiting beacon supplied by the interrogation system. This is done by having the first baiting beacon provide channel assignment parameters in either the sync message or the neighbor list messages (1102). Once the access probe of a wireless device that is to be herded is detected in the first baiting beacon, the interrogating system responds to the access probe with a message on the forward paging channel that indicates that the wireless device is to operate on the herding channel. As soon as the message has been set, the first baiting beacon lowers its power to prevent any additional wireless devices from being baited and redirected to the herding channel. At this point the wireless device is the only wireless device in the herding channel and can be interrogated at leisure by the baiting beacon on the herding channel.

The herding beacon can modify the parameters it provides to the herded wireless device so that the herded wireless device can be trapped in a continuous registration mode on the herding channel. In this mode, the wireless device will broadcast continuously without further interaction between the baiting beacon and the wireless device. Where continuous broadcasting by the wireless device is undesirable, the baiting beacon may send paging messages to the herded wireless device to elicit additional transmissions from it. The more transmissions the herded wireless device sends, the easier it is to locate it. Herding can also be used to disable the herded wireless device. To do this, the baiting beacon for the herding channel prevents the herded wireless device from either placing outgoing calls or receiving incoming calls.

The baiting beacon for the herding channel can also use a herded wireless device to measure the strengths of the pilot signals from the relevant beacons. This can be done by means of a message from the baiting beacon requesting a pilot strength measurement or by listening for an automatic pilot measurement report message which the CDMA standard requires the wireless device to send to the beacon that the wireless device is monitoring. As will be described in detail below, the pilot strength measurements can be used to locate the wireless device.

Disablement

As already mentioned, the interrogation system may use data base (107) to determine whether a wireless device is to be disabled. Once it is determined that a wireless device is to be disabled, there are a number of disablement techniques available. One such technique is using maintenance features provided in the CDMA standards can be used by a baiting beacon to disable a wireless device. The CDMA standard provides that when the network detects a malfunctioning wireless device, the beacon being monitored by the wireless device may send a lock until power cycled command which locks the wireless device and thereby disables it until the wireless device is power cycled. Another such technique is to herd the wireless device onto a channel whose baiting beacon does not respond to calls from the wireless device, calls to the wireless device, or both.

Minimizing Collateral Interference by Using Override Beacons to Override Control Messages in CDMA Wireless Systems Beacon Taxonomy In the following, beacons are characterized by the following taxonomy:

Live Beacons—Beacons which are produced by the network with which a target wireless device normally interacts.

Interloping Beacons—Beacons created by a party to either manipulate the existing network via signal overrides that move(s) (a) wireless device(s) off of the live network or auxiliary off network beacon signaling that captures and/or subsequently manipulates target wireless away from the network. Classes of interloping beacons include:

Jamming Beacons—Beacons that produce continuous interfering signals expressly for the purposes of denying access to the cellular network.

Attractive Beacons—Beacons that entice a wireless device to reregister with the attractive beacon, which permit the party providing the attractive beacon to inventory heretofore unknown wireless devices or to affirm the presence of target wireless devices and then optionally gain control of selected wireless device(s). The baiting beacons of U.S. Ser. No. 12/065,225 are attractive beacons.

Override Beacons—Beacons that surgically override portions of the live signaling to either manipulate a target wireless device in situ on the live network or expressly move a phone to a catch beacon operating away from the live network. Override beacons differ from attractive beacons in that their surgical nature allows them to operate without affecting collateral devices that are not of interest.

Catch Beacons—Beacons that are designed to catch or otherwise trap wireless devices and subsequently manipulate them.

Registration Beacons—Catch beacons that have modified signaling in order to elicit an automatic registration when a wireless device is moved from the live network to the catch beacon.

The Problem

As set forth in U.S. Ser. No. 12/065,225, the general technique for setting up a baiting beacon is to perform a survey of the live environment or more specifically find a live beacon example, acquire the neighbor information therein, clone this information and modify a small number of settings related to what is variously termed the location area or registration zone. A baiting beacon is then proffered on either a neighbor frequency channel or a neighbor pilot channel, depending on the standard. The baiting beacon entices a wireless device to believe that it has entered a new registration area and must therefore reregister with the network to update its position so that network can properly route incoming calls. The baiting beacon then accepts registrations from all wireless devices in proximity to either perform an inventory or to determine if a particular wireless device is present.

A problem unique to both CDMA and CDMA 2000 is that all wireless devices which are interacting on any given frequency channel with a live beacon interact with the pilot channel in that frequency channel. The standard techniques for using a baiting beacon to interact with a specific wireless device (called herein the target wireless device) requires that the baiting beacon use the pilot channel in the live pilot's frequency channel. Therefore it becomes difficult in general to engage a single target wireless device without collaterally affecting all of the wireless devices operating on the same frequency channel within some proximity to the target wireless device. Where the standard baiting beacon techniques target wireless device is in idle mode (i.e., not engaged in a call), other wireless devices are denied access to the live beacon while the baiting beacon is transmitting. With wireless devices that are in traffic mode (i.e., engaged in a call), the standard baiting beacon techniques at a minimum interrupt the calls of all the wireless devices in traffic mode that are in proximity to the baiting beacon and likely the target wireless device and may also cause of the calls to drop, and thereby alerts the users of those wireless devices.

Figure 12:
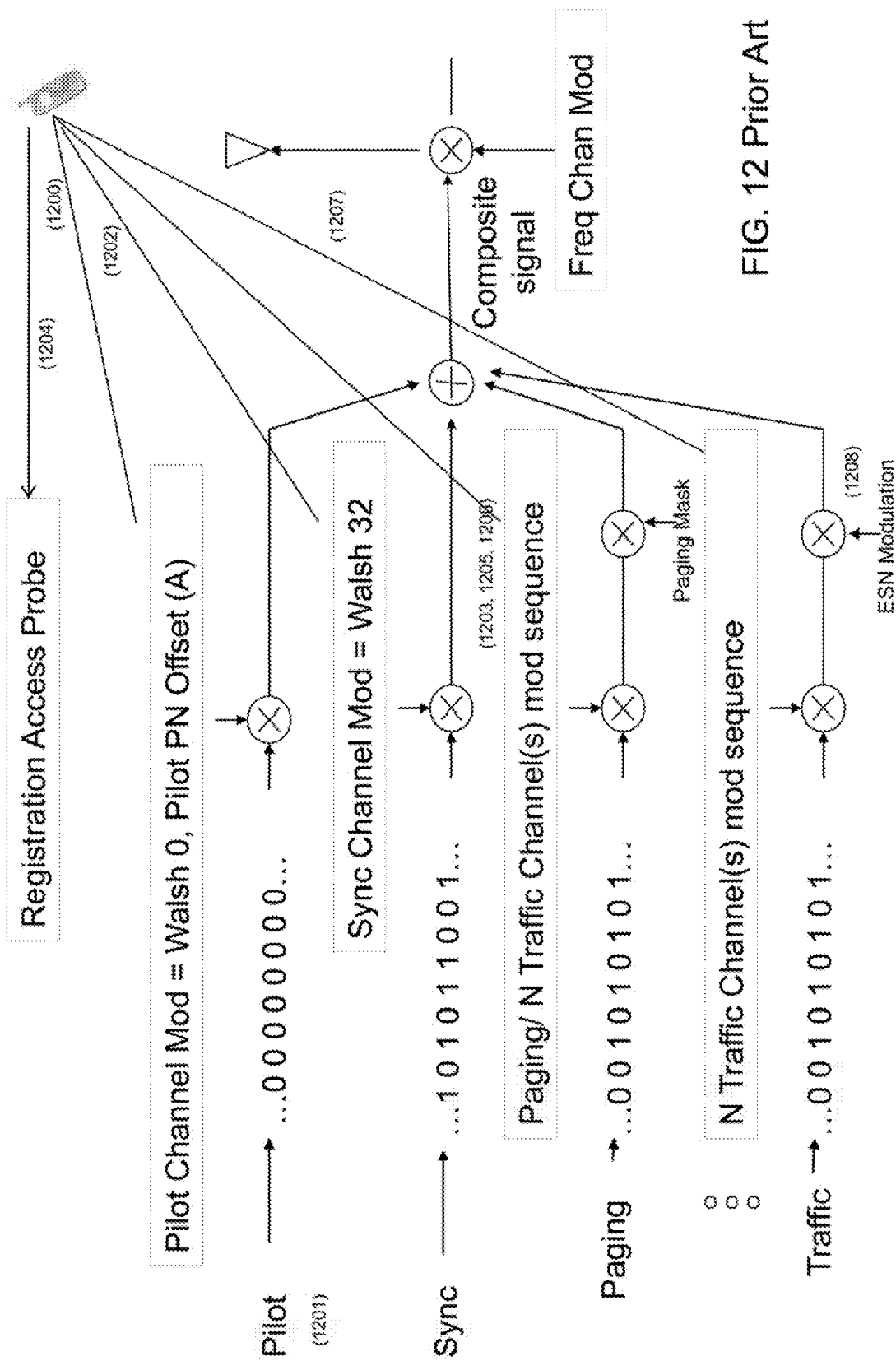
FIG. 12 Summary description of CDMA 2000 forward channel signaling from the base station to the handset.

FIG. 12 shows the wireless device registration process in CDMA. A CDMA wireless device (1200) must be synchronized with a beacon operating on some frequency channel. The CDMA wireless device acquires synchronization information from the beacon's common pilot channel (1201). The CDMA wireless device uses the synchronization information to align to the common synchronization channel and recover the synchronization message, which among other things disambiguates the phase of the pilot with respect to GPS time (1202). Once this timing has been achieved the wireless device then listens on the common primary paging channel where it acquires the overhead messages (1203) that variously describe the beacon itself such as the service provider, the technology revision, parameters for accessing the beacon etc. The wireless device proceeds to register with the beacon by generating a registration access probe (1204) with identifying information which the beacon subsequently acknowledges on the paging channel (1205).

After registration, a wireless device that is not participating in a call is in idle mode. It monitors the primary pilot of the beacon on which the wireless device is registered as well as other potential pilots specified in the neighbor list in the overhead messages.

While in idle mode the wireless device also continuously monitors the paging/quick paging channels awaiting a page from the network most typically indicating an incoming call. The wireless device also continues to monitor the overhead messages on the same paging channel looking for any changes which are indicated in a specific (configuration) fields of the messages and if these fields change the wireless device will reacquire the message anew and modify its behavior accordingly such as changing its internal information or perhaps moving to another frequency channel.

If the wireless device moves in space either when it is in idle mode or when it is in traffic mode and another pilot's signal consequently stronger than the original pilot it will switch over to the other pilot, recover the overhead messages from that pilot's beacon, and check the new beacon's registration parameters—most notably the registration zone. If the new beacon's registration zone differs from that on the original beacon, the wireless device will reregister with the new beacon in the presumption that it has moved to a new registration zone. It is this reregistration behavior of the wireless device which provides the basis for interrogation.

When the registered wireless device enters the traffic mode, either to originate or answer a call, the wireless device generates an access probe that is expressly synchronized to the pilot (1204). The network responds by assigning a traffic channel for the call to the wireless device. The information in the channel is encoded using a code that is unique to the channel and to the call (1206). The wireless device uses information from pilot (1201) to modulate and/or demodulate the traffic on the assigned code channel (1207).

As in idle mode, the wireless device constantly monitors all of the neighbor pilots and reports their signal strength to its beacon. This is known in the art as mobile assisted handoff (MAHO). When the network determines that another pilot is stronger than the current pilot as reported by the wireless device, the beacon directs the wireless device to move (handoff) to a new code channel that is synchronized to the new beacon.

In both traffic mode and idle mode, the wireless device remains precisely locked to the pilot channel of the beacon with which it is registered. The same is the case for all wireless devices operating on that beacon's frequency channel. Because this is the case, an attempt by a baiting beacon to influence the behavior of a particular target wireless device by overriding a substantial portion of the target wireless device's pilot will noticeably affect not only the target wireless device but also all other wireless devices that are locked to that pilot. As noted above, the effects range from reregistration of wireless devices that are in idle mode through interruption of calls with wireless devices that are in traffic mode to dropping of such calls.

Figure 13:
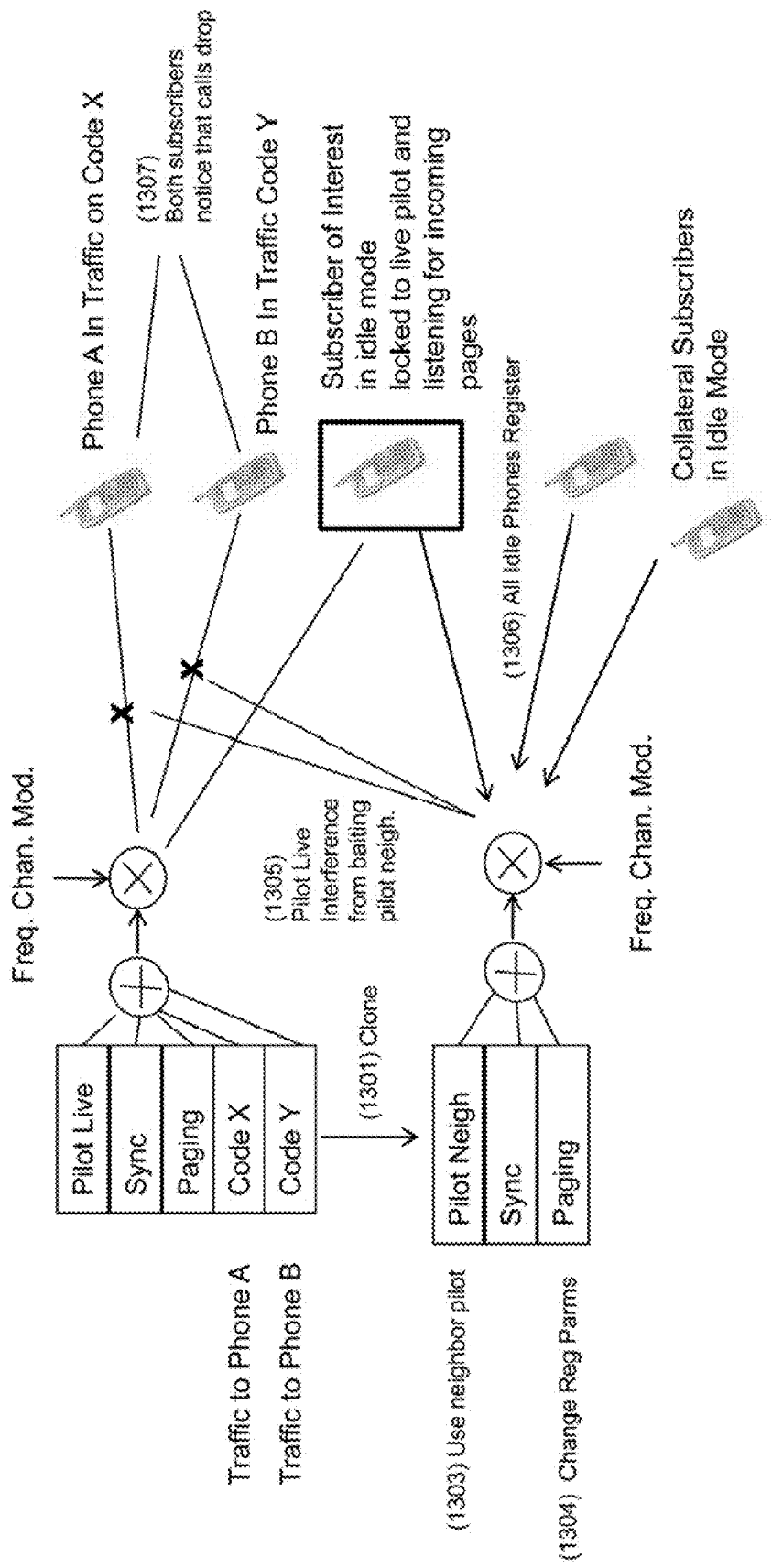
FIG. 13—Illustration of problems of interfering with collateral subscribers when using conventional interrogation techniques.

Baiting Beacon Limitations in CDMA: FIG. 13

A baiting beacon acquires any given live beacon and clones all of the overhead messages. Once all of the system information messages have been acquired it is typically sufficient to simply reconstitute these messages in two on the override beacon (1301) with the exception of the registration parameters (e.g., the registration zone) carried in the system parameters message, which is necessarily modified to have a value that is different from that of the cloned live beacon.

The override beacon generates at a minimum a pilot, synchronization and a paging channel. The pilot offset is adjusted to be that of a neighbor in the list (1303) and possibly but not necessarily one that is far down in priority (e.g., furthest away) so that it limits competition with an actual live neighbors that may be in proximity. A set of overhead messages that are clones of those on the live beacon, except the aforementioned registration parameters, are simultaneously broadcast on the paging channel (1304). In CDMA multiple channels are allocated in general for purposes of load balancing. In each of these channels the beacon will broadcast a frequency channel list that is the same for all of the channels. As provided in the standard, the wireless device picks the channel on which to operate by running its MIN (telephone number) through a hashing algorithm that uses this frequency channel list and from this unilaterally selects the frequency channel on which it will operate. Since the target wireless device's MIN is known, and the live beacon being cloned provides the frequency channel list, the method can determine in advance which frequency channel the mobile is operating on. To force the target wireless device to interact with it, the cloned baiting beacon overrides the live beacon in toto.

The problem with respect to collateral interference becomes immediately clear. The baiting beacon necessarily interferes with the live pilot and therefore all calls that are in progress on that frequency channel will more than likely be affected—possibly to the degree that calls drop (1305). Further still, not just the target wireless device will reregister with the baiting beacon, but also all other wireless devices within some proximity (1306).

While the baiting beacon can interact only with the target wireless device, ignoring all of the other wireless devices on the frequency channel, when the override beacon does so, it prevents the other wireless devices on the frequency channel from entering traffic mode (making incoming or outgoing calls while the baiting beacon is active). Further, the calls of wireless devices that are in traffic mode when the baiting beacon overrides their live beacon will all be dropped simultaneously. The baiting beacon thus becomes an indiscriminate jammer of all other wireless devices whose live beacon is being overridden by the baiting beacon. All of this may of course serve to warn the target wireless device's subscriber that his wireless device is being manipulated (1307).

The General Solution to the Problem

The general solution described in the following permits an override beacon to override a control message which is specific to a target wireless device without overriding too much of the live pilot channel to which the target wireless device is locked to affect the relationship of either the target wireless device to the live pilot channel or the relationship to the live pilot channel of any other wireless device that is locked to the live pilot channel. The control message for the target wireless device may either be in a common channel if the target wireless device is in idle mode or, if the target wireless device is in traffic mode, in the target wireless device's dedicated traffic channel. Because the control message is specific to the target wireless device, overriding the control message affects only the target wireless device. The CDMA standard precisely specifies both the locations and structures of control messages for particular wireless devices in the common channels and also precisely specifies the locations, structures and modulation of control messages in the traffic channels. If in idle mode the invention will expressly page (address) a wireless device of interest. If in the traffic mode control messages in a particular traffic channel are of course responded to only by the wireless device with which the traffic channel is associated.

The method of the general solution is the following:

determining an overriding control message that will obtain the required response from the target wireless device if the corresponding control message from the live beacon is overridden by the overriding control message;

making an override beacon which is a clone of the wireless device's live beacon at least as regards the pilot channel and the channel to which the control message to be overridden belongs;

synchronizing the override beacon with the live beacon;

determining a precise time at which the override beacon must output the overriding control message in order to override the control message output by the live beacon;

in the override beacon, overriding the live beacon's pilot channel with the clone of the pilot channel just enough ahead of the time at which the overriding control message must be output and with sufficient enough strength that the target wireless device will respond to the overriding beacon rather than the live pilot channel when the overriding control message is output by the override beacon;

in the override beacon, outputting the overriding control message at the time required to override the live beacon's control message; and in the override beacon, terminating output of the overriding pilot on termination of the output of the overriding control message.

The short duration of the pilot beacon override and the limitation of the control message override to the location of the control message in the corresponding channel of the live beacon results in changes in the live beacon's frequency channel as overridden by the override beacon that are so small that the changes appear to other wireless devices that are interacting with the live beacon as noise and are dealt with by the other wireless devices in the same fashion as they deal with noise generally.

A critical refinement of the override beacon in relation to the baiting beacon is that it is not necessary for a baiting beacon to expressly time lock to the live beacon which is it overriding. In the latter case the wireless device will resynchronize entirely to the baiting beacon. In the former case the override beacon must surgically time the injection in a small window of opportunity (a few 10s of microseconds) and must expressly modulate and code the signal to match that of the live beacon in order for the override message to be accepted by the wireless devices of interest without affecting the subsequent reception of signaling that follows the injection.

Details of the general method will depend on whether the control message is carried by a common or a dedicated channel and of course also on the standard. In CDMA and CDMA 2000, the standard's idle mode provides interesting examples of the method's use with control messages carried by a common channel.

Using an Override Beacon to Override Paging Messages

The quick page channel is a common channel that is new in the CDMA 2000 standard. It is described in 3GPP2 C.S0002 Section 3.1.3.6. The purpose of the quick page channel is to conserve the battery life of the wireless device by permitting a wireless device in idle mode to keep its receiver powered off except at very small windows when it can expect to get an alert from the beacon with which it is registered that an incoming message is imminent. Prior to CDMA 2000 the wireless device turned on its receiver at set times in order to listen for messages. However the total time to listen could be on the order of 10s of milliseconds every few seconds. Further receiver on time is required because the receiver must be restarted in advance of each listening time. With the advent of CDMA 2000, a new common channel has been added: the quick paging channel. A wireless device constructed according to the new standard now listens in a very small sliver of time (approximately 100 uS twice in 80 mS) on a quick paging channel to establish whether there is a quick page alert for it on the quick paging channel. If there is an alert, the alert will be followed by a paging message for the wireless device on a following frame of the common paging channel. The key improvement in the standard is that it is no longer necessary for the wireless device to regularly wake up and listen for the entirety of its message window on the common paging channel when looking for a message that is on balance very infrequent (e.g., a mobile might receive only several phone calls per day but listen once per second or 86400 times per day). Instead it can perform a very quick check using a limited amount of receiver setup to determine if it should expend the energy to bring the receiver full on for the full paging message.

Figure 14:
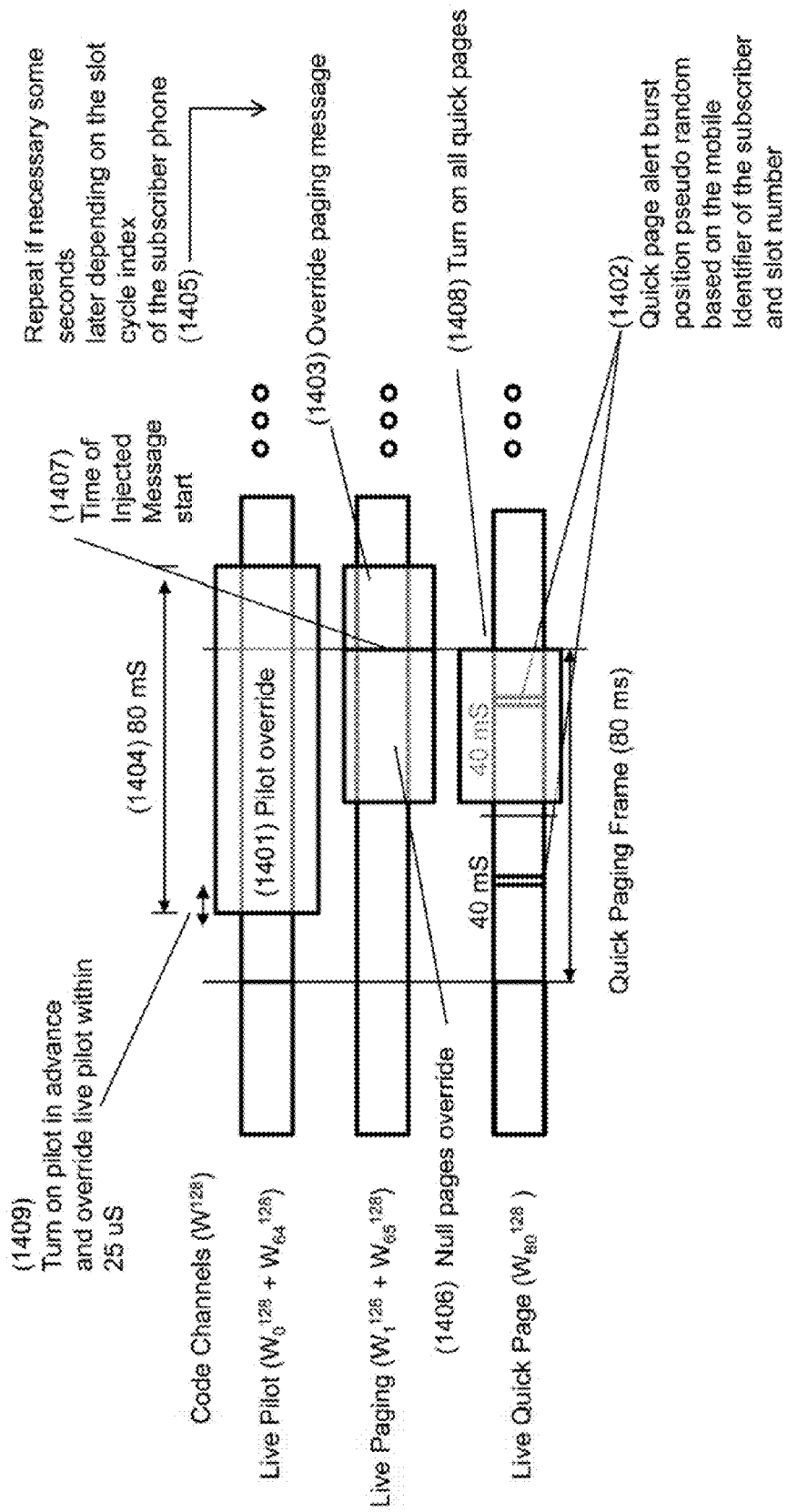
FIG. 14—Illustration of a signaling technique for surgically paging a wireless device of interest on the CDMA 2000 paging channel using the quick paging option.

As shown in FIG. 14, the override beacon uses GPS to generate an overriding pilot exactly timed to the live beacon's pilot (1401) While the overriding pilot is being generated, the override beacon generates an overriding quick page alert (1402) on the quick page channel at a time which immediately precedes the paging slot which the target wireless device uses on the paging channel to listen for pages from the live beacon. Finally, the override beacon generates an overriding page message (1403) on the target wireless device's slot in the common paging channel. When the overriding page message is done, the override beacon ceases generating the overriding pilot. As shown in FIG. 14, the total time of the pilot override is 80 mS and the quick page alert and paging message overrides are done within the 80 mS. The 80 mS (1404) is so short that it neither prevents wireless devices in idle mode from originating or receiving calls nor perceptibly affects the audible quality of any traffic channels on the live beacon. It is further so short that none of the wireless devices which are interacting with the live beacon will attempt to reregister with the override beacon.

The time at which the override beacon begins to generate the overriding pilot is determined from the time at which the overriding page message (1403) for the target wireless device occurs must be generated. The quick page alerts occur in a quick paging frame of the quick page channel which is timed to occur just ahead of the paging messages on the paging channel. Each wireless device which is registered with the live beacon has a slot for its quick page alert in the quick paging frame. The location of the slot is a function of the ESN of the wireless device. The ESN for a given wireless device occurs once in the first 40 mS of the quick paging frame and then again in the second 40 mS of the frame. The repetition is purely for redundancy purposes because the quick page alerts are brief, uncoded and unprotected (i.e. easily subjected to symbol errors hence missed by the wireless device). (1402). The override beacon forgoes sending the quick page in the first 40 mS because doing so allows the overriding pilot to remain on long enough to potentially create a perceptible discontinuity in the audio of the traffic channels. Since the quick paging alert is not a protected symbol, it may be necessary to repeat the overrides shown in FIG. 14 several times of over some number of seconds (as a function of the slot cycle index used by the wireless device) to gain the attention of the target wireless device (1405).

Normally it is only necessary to override a specific symbol in the quick page frame (1402). This is sufficient because the quick page alert is necessarily time locked to the live beacon pilot (i.e., is within the pilot ambiguity span of +/−25 uS). At the same time the override beacon begins overriding the quick page alert, it begins overriding the paging channel. The paging channel override overrides three paging messages; the first two are overridden with null messages; the third is overridden with the paging message for the target wireless device (1406). The null messages are necessary because the paging channel is continuously coded rather than block coded. Because the paging channel is not block coded, it is not enough to merely turning on the paging message for the target wireless device at the appropriate time (1407) because the target wireless device's decoder will not be in the right state to decode the overriding paging message properly. Therefore the purpose of the two null messages is force the receiver in the target wireless device to flush the decoder and therefore place it into the proper decoding state just prior to the sending the override paging message. The override beacon also simplifies the generation process by turning on all quick page alert symbols in the second half of the quick page slot. Little penalty is paid for this because the paging channels must necessarily be on for this period (1408). Working backwards from this start time, the overriding pilot is turned on from 20 to 40 mS prior to the start of the paging channel override (1409) so that receiver in the target wireless device can acclimate to both the timing and level of the override. In order for the target wireless device to respond to the overriding quick page alerts and paging messages, the overriding pilot must be stronger than any channel in the live beacon by several dB. Consequently, overriding the live beacon's paging and quick paging channels has little effect on the automatic gain control in the target wireless device.

Several refinements which further minimize the length of time during which the override beacon must override the pilot beacon are possible. For example since the timing of the quick page alert is pseudo-random within either 40 mS half of the quick paging slot, the override beacon might wait until the quick page alert occurs in the last 20 mS of the second half of any quick paging slot and then only generate a single null page message. The overriding pilot would then start 20 mS before that, which would reduce the on time of the overriding pilot to possibly 60 mS, with the understanding that the penalty paid for the shorter on time is an increase in the time which the target wireless device may require to respond to the overriding quick page alert and page message.

A further advantage of turning on all of the quick page symbols in the last 40 mS of the quick paging frame is that, as shown in (1402) the pilot override, while within the ambiguity span permitted for the pilot is not precisely on top of the live pilot and may become even less precise due to localized propagation delays or reflections as seen at the target wireless device. Further still the AGC in the wireless device needs time to react to the overrides. Turning on all of the quick page symbols thus reduces the chance that the overrides will have to be repeated.

The target wireless device responds to the overriding paging message with an access probe which is detected by the override beacon. The override beacon in turn responds with a channel assignment paging message that moves the wireless device to a quiet traffic channel under control of a catch beacon which can be used to manipulate the target wireless device at will without affecting non-targeted wireless devices on the live beacon (e.g., interrogated, caused to continually broadcast, receive a text message etc). The override of the live beacon required to generate the channel assignment message requires only a 20 mS override of the live beacon's pilot channel prior to the override of the live beacon's paging message for the target wireless device and a 20 mS override during the override of the paging message, for a total override of the live beacon's pilot of 40 mS, which is so short as to be inaudible to collateral subscribers that are in the traffic state.

The override beacon can override the paging message which the live beacon intends for the target wireless device as described above without overriding the page alert. While this may be sufficient for wireless devices the predate the CDMA 2000 standard, wireless devices that implement that standard require the quick page alert before they will respond to the paging message. Therefore overriding both the quick page alert and the paging message works with both classes of wireless devices.

The premise throughout is that the ESN of the targeted wireless device is known in advance, so that the locations of the targeted wireless device's paging messages and quick page alerts in the live beacon's code channels are known.

Using an Override Beacon to Override Control Messages in Traffic Mode

When the target wireless device is in traffic mode, it is interacting with the live beacon on a traffic channel which is dedicated to the target wireless device. In addition to the voice data for the telephone call, the information on the traffic channel includes control messages. The control messages have locations in the traffic channel which are dictated by the CDMA standard. By using the techniques already described, the override beacon can override a control message in the traffic channel for a target wireless device. The traffic channel for the wireless device of interest is encoded so that only the target wireless device can read the data on it. Consequently, in order to apply the methods just described to control messages in the target wireless device's traffic channel, the override beacon must determine whether the target wireless is in traffic mode, and if so, which traffic channel the target wireless device is using. The overriding control message must be encoded and timed as required for that traffic channel.

FIG. 12 shows the structure of the CDMA forward channel signaling (i.e., signaling from the live beacon to the cell phone. It consists of a pilot channel (1201) and a traffic channel for each of the wireless devices that are currently interacting with the live beacon in traffic mode. Within each traffic channel, a sequence of Walsh symbols conveys the information carried by the traffic channel. Each Walsh symbol is modulated (pseudo-randomly flipped) (1208) as a function of the long code mask (LCM) supplied by the network at call set up. The LCM can either represent the electronic serial number (ESN), along with some other fixed bit fields as described in 3GPP2 C.S0002 Section 3.1.3.10.7, of the device to which it is communicating or it can be handed out at random to improve privacy. In the following, it is presumed that the long code mask uses the wireless device's ESN.

Figure 15:
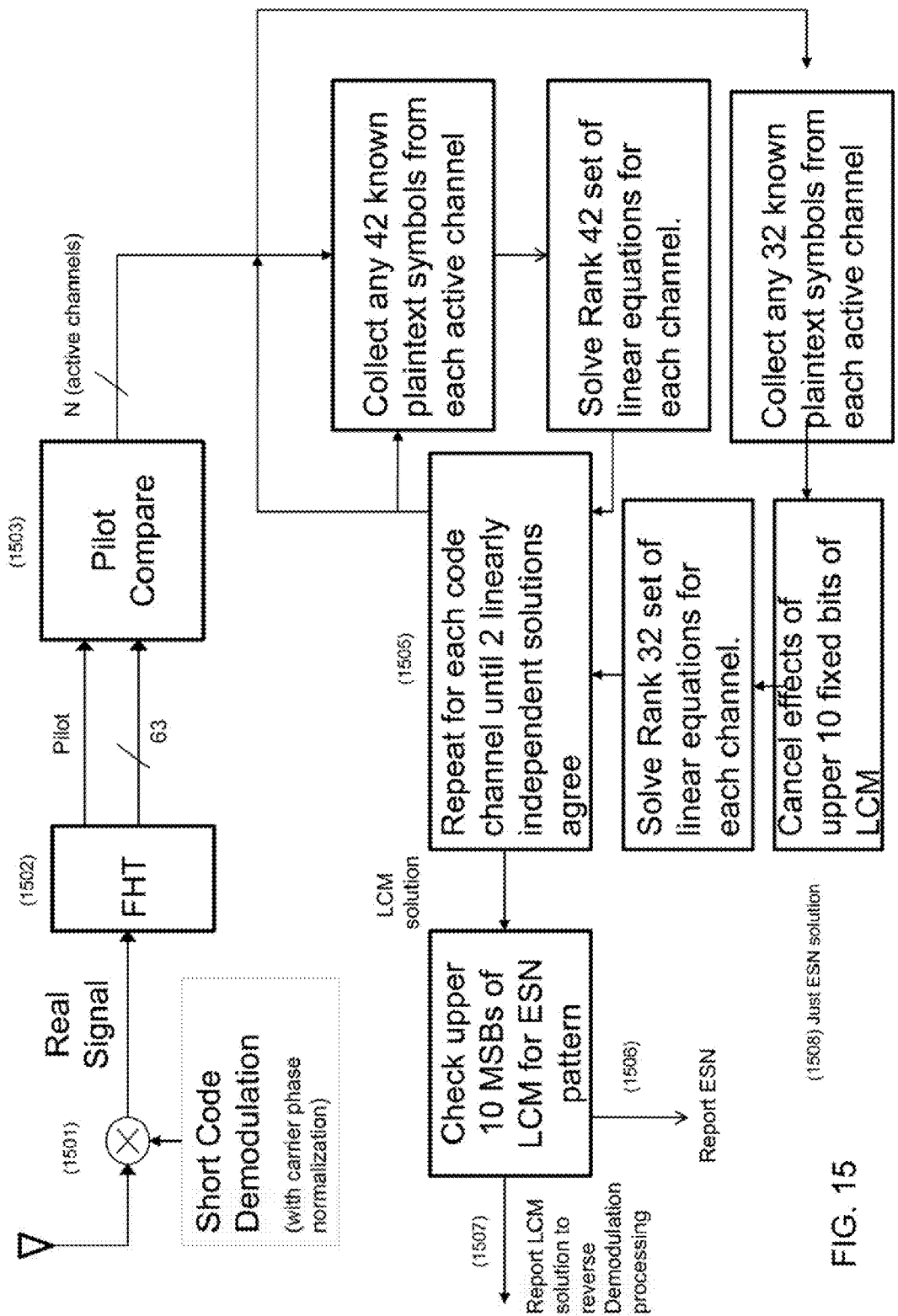
FIG. 15—Method of recovering the long code mask from any given wireless device operating on any given forward code channel and determining whether the mask is based on the wireless device's electronic serial number (ESN).

In order for the override beacon to override a control message in the traffic channel of a target wireless device, the override beacon must know the LCM for the target wireless device's traffic channel and then use the LCM to encode the overriding control message. FIG. 15 shows how the ESN, and thus the LCM, for the target wireless device can be determined. The forward signal produced by the live beacon is demodulated (stripped of the short codes and carrier phase normalized) and the code channels are then despread (1501) simultaneously and separated using a Fast Hadamard Transform (FHT), creating a symbol stream for all 64 code channels simultaneously (1502). Code channels 0 is reserved for the pilot. Therefore it is possible to detect which other code channels are active (i.e., must he searched for the ESN) by comparing the signal levels symbols of the code channel to that of the pilot (1503).

Next, for any set of 42 known plaintext symbols that will appear in the traffic channels, form a Rank 42 matrix (presumes linearity due to correlation properties of the long code) and solve for the LCM using classical Gaussian elimination (1504) as expressed below:

$$Ax+p=y$$

where the rows of matrix A represent the long code state at the time the symbol was collected, the vector y contains the observed symbols, the vector p is the known plaintext and x is the sought after solution vector, the bits of which are the LCM. This can be reformulated as $$Ax=y-p$$

where the known plaintext is removed from the observation vector y and thus reducing the problem of determining the LCM to a simple linear solution.

Checks must be performed to ensure that the matrix is linearly independent (rank=42). A rank of less than 42 (linear dependence) may result from symbol errors or possible localized correlation in the long codes. The most direct method is to detect any row in the matrix where there is linear dependence and then substitute this with a new symbol and associated long code state. However the check for linear independence is such that it is typically more economical to just repeat the process for any set of 42 symbols (e.g., just collect 42 more) and then declare a solution once any two agree of the solution vectors agree. The permuted ESN is then extracted from the lower 32 bits of the 42 bit solution vector (1506). An important innovation is that this method is tolerant of symbol errors. For example if one or more symbol errors occur then the wrong solution is obtained. However the autocorrelation properties of the long code generator ensure that the probability that random symbol errors will produce the same solution twice within the search period is vanishingly small. Here the method simply keeps taking set of 42 symbols (typically each over a period of approximately 2 seconds) and waits until any two agree before declaring a solution (1505).

The search for the LCM for the target wireless device's traffic channel can be refined by noting that the upper 10 bits of the LCM are fixed. It is consequently possible to strip off the upper 10 bits and reduce the matrix to a rank of 32 and thereby solve only for the permuted ESN bits directly. The refinement simply applies the 10 bits of mask to the long code state and sums the result (modulo 2) and then sums this result with the observed symbol collected at this code state (modulo 2), thus cancelling the effect of this portion of the LCM on the solution (1508).

In determining the LCM, it is not necessary to know the actual state of the collected (plaintext) symbols but rather only to know that the collected symbols are consistent. For example if it is known that in each 20 mS frame one of the bits will always be in the same state then it is a matter of collecting this bit from 42 frames and performing the above described solution of linear equations. The only drawback is that the result will be ambiguous in that there are two possible solutions—either the LCM or the bit flip thereof. However this is no more than a minor inconvenience with respect to the LCM because the reverse channel processing can simply try either mask on the reverse channel when looking for phones. Furthermore when checking for ESNs the solution can be disambiguated: if the upper 10 bits or bit flip thereof match the fixed bits associated with an ESN mask. In that case, it can be inferred that the LCM has those upper 10 bits (1506). This observation is also important when dealing with frame offsets employed by CDMA. Heretofore the method ignores the fact that frame offset is in general unknown and hence it becomes difficult to say where in time the plain text bit of interest actually occurs. Since the plain text bit can have one of 16 possible offsets, all 16 must be tried, implying a compute factor increase of 16. Instead the method can pick any symbol from each frame regardless of offset in the hope that it will be consistent from frame to frame and possibly reduce the time to find a solution. This is not unreasonable, since it is expected that in a conversation, either the forward or reverse channel will be silent half the time and hence revert to a consistent signaling pattern on a per frame basis. If the symbol at the selected point in the frame is not consistent then at most it delays the time to acquire due to the necessity of searching for other consistent symbols. An incorrect solution is however not reported because it takes 2 matches to declare a solution and the long code autocorrelation properties are such that the probability is very low (e.g., akin to a CRC false positive) of this occurring in practice—and even then this would be corrected soon after by the monitoring process described below.

The technique for determining the target wireless device's LCM also takes advantage of the fact that the traffic channel in either direction will regularly fall back to a lower rate when there is no voice activity. In this case the coders employed in the CDMA standard on the forward traffic channels introduce symbol repetition (denoted here as 'a' and 'b') just before the interleave process. This can be used to advantage to cancel the plaintext symbol and thereby obviate the need to know the specific plain text symbol value (i.e., whether it was a one or a zero). This is achieved by bit wise summing modulo 2 the long code state (i.e., the row entry in the solution matrix 'A') associated with the 'a' symbol with the long code state of the paired interleaved 'b' symbol and then adding the two observed symbols (Ya and Yb) modulo 2 which has the effect of cancelling the plaintext symbol. If this is repeated for any 42 symbol pairs in the interleaving span then a linearly independent set of equations can be collected to determine the solution vector X (i.e., the LCM mask). The innovation is that the solution can be determined rapidly within a single CDMA signaling frame of 20 mS (as opposed to 1 second described previously) as it is not necessary to limit collection to specific times when a the plaintext state inconsistent. An important extension is that the solution obviates the need to determine the frame offset as is the case with the non-fallback mode. The reason is that the interleaving guarantees symbol repetition every 10 mS regardless of frame offset.

The matrices are solved for every active channel every few seconds so as to discover when the LCM changes. Again when the solution gets two solutions that agree, the new LCM is reported (1505).

Once the LCM solution for any given code channel has been found, the LCM can be used to decode and monitor the symbols in the LCM's code channel. From the monitoring, the frame offset of the monitored channel at which the symbols, occur can be determined. This information may be useful in the voice processing of the traffic on the traffic channel. For example it becomes possible to perform a pattern match at the 16 offsets which are expected to be in the traffic frame offsets to look for certain frame structure aspects (e.g., determine the frame offset of the null pattern associated with DTX on the forward channel by locating the 0 tail bits used to flush the convolutional encoder in each frame). As described previously this step can be omitted if it is detected that forward channel signaling is in fallback mode.

Once a traffic channel LCM is determined which has the ESN of the wireless device of interest, it is clear that the wireless device of interest is operating in traffic mode. Using the LCM, it is then possible to use the override beacon to override control messages on the target wireless device's traffic channel. The forward and reverse channels for a given wireless device that is interacting with a live beacon both use the same LCM. This makes it possible for either the invention or a third party receiver to receive reverse channel signaling as well. Because that is the case, a capture beacon can interact with a target wireless device in the same fashion as would the network.

Figure 16:
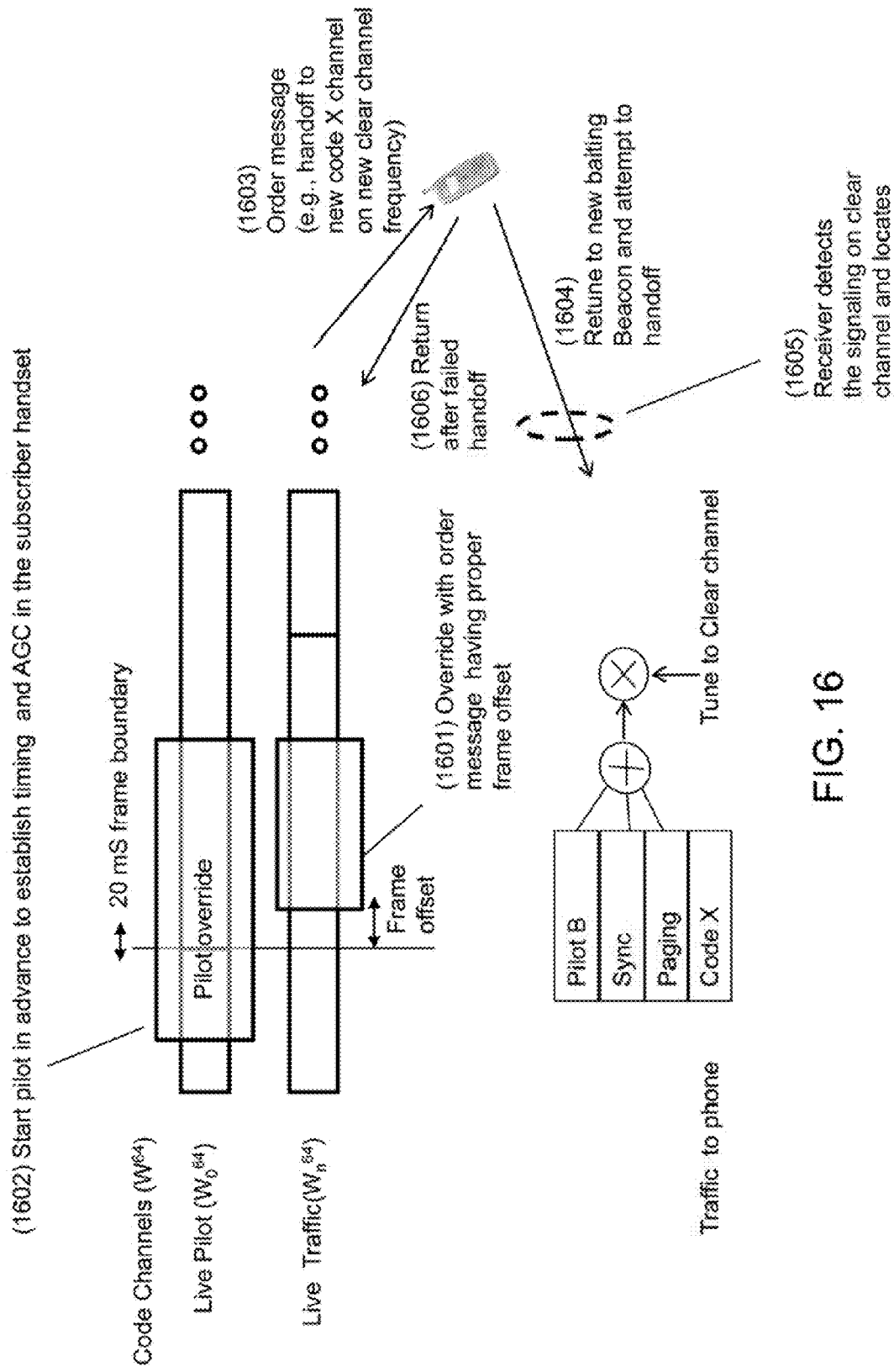
FIG. 16—Method of forcing a call in progress to attempt a handover to a clear channel to effect location of a wireless device of interest.

The way in which the overrides are done is the same as that used for the paging in idle mode except the messages being overridden are on the target wireless device/s traffic channel rather than on the quick paging and paging channels. As shown in FIG. 16, the override beacon generates an overriding pilot and an overriding control message at the point in the traffic channel for the target wireless device where the message will appear in the live beacon's signal (frame offset 501). The pilot is introduced some time before the start of the control message (e.g., 20 mS) so as to acclimate the pilot timing recovery and the AGC in the wireless device (1602). The control message must of course be encoded using the LCM for the traffic channel.

The override beacon than may introduce any number of the legitimate order messages summarized in 3GPP2 C.S0004 Table 3.2.2.2.1.2-1 by overriding the portion of the target wireless device's traffic channel that carries the order message. Examples include sending a power control message to increase the power of the signal broadcast by the wireless device and thus make it easier to locate or sending a handoff message which causes the wireless device to perform a handover (1603). In the latter case, the wireless device might be directed to hand itself over to a capture beacon set up on some unused frequency channel. The target wireless device will make a brief attempt to perform a hard handover to the capture beacon, at which point one or more receivers can take advantage of the handover signaling (e.g., locate the target wireless) (1605). When the handover fails, the target wireless device will return to the live beacon at which the control message was overridden. (1606).

The override beacon's failure to accept the handoff serves the purpose of temporarily separating the target wireless from the other wireless devices interacting with the live beacon long enough that it can be uniquely located and then let go before the network drops the call or alerts the subscriber that anything is amiss other than the brief dropouts that routinely occur on cellular calls. In the meantime the other wireless devices interacting with the live beacon remain unaffected. The method anticipates design the catch beacon to minimize the amount of time it takes for the target wireless device's handover to fail, so that the call drop out time is minimized. For example the catch beacon to which the handover is directed might detect the handover complete message issued by the handset and then cease transmitting completely, thus failing to consummate the handover and causing the wireless device to return to its original channel. Another possibility is for the catch beacon to issue an order message that is out of context (e.g., an order release) as opposed to the expected order complete message. Yet another refinement is to expect that the wireless device will start reverse channel generation before issuing the handover complete message. In response to the start of the reverse channel generation, the catch beacon might cease transmitting before the wireless device even has a chance to issue the handover complete message, thereby further minimizing the drop out time between when the wireless device moves to the catch beacon's frequency channel and when it returns to the live beacon's frequency channel. It is also anticipated that the catch and return process would be repeated with varying periodicity so that a pattern is not discerned by the subscriber. The foregoing is exemplary but not exhaustive.

Figure 17:
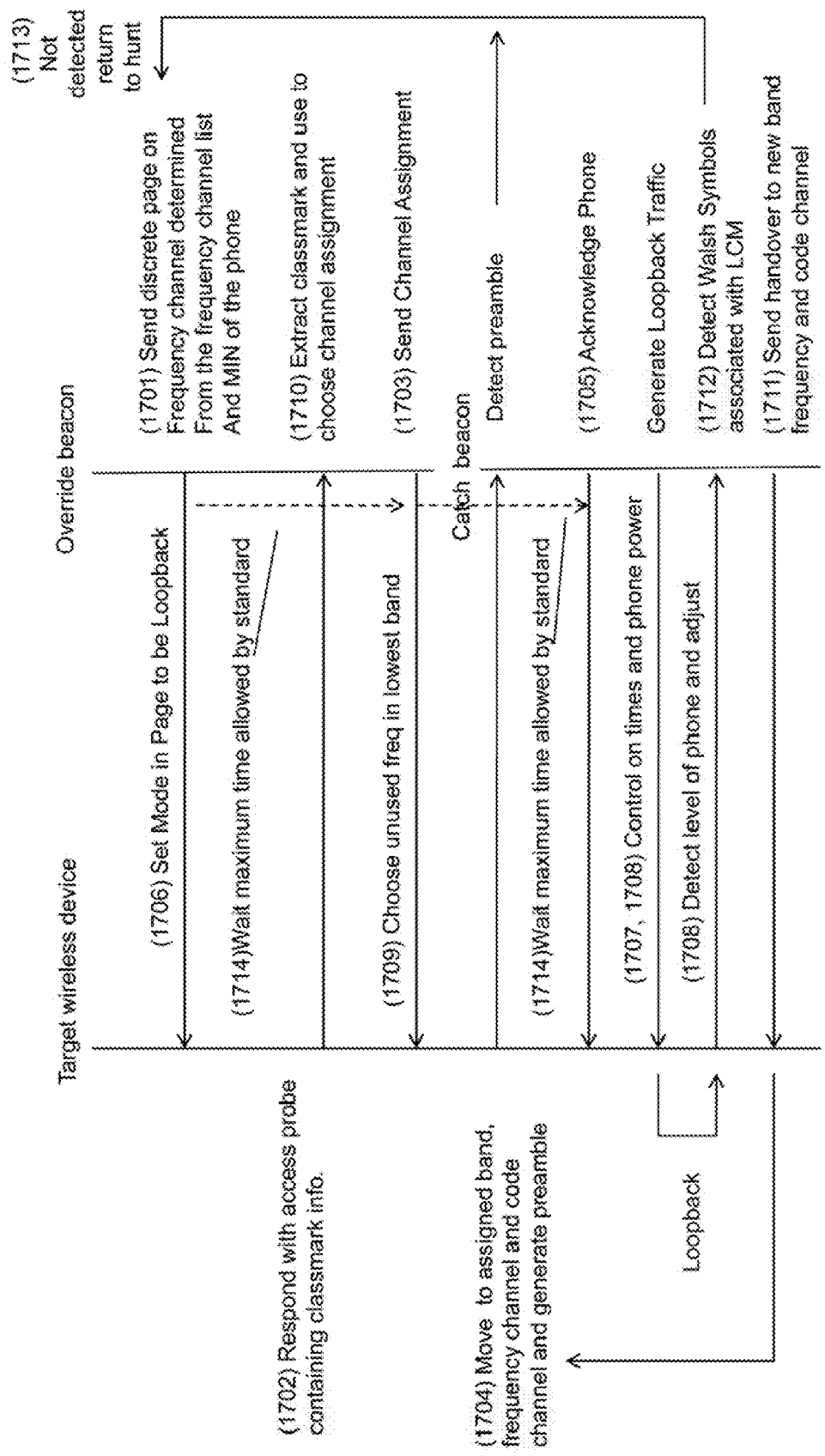
FIG. 17—Methods of improving the range of operation of the interloping beacon.

Further Interactions Between the Override and Catch Beacons and the Target Wireless Device Once the target wireless device has responded to the overrides from the override beacon, the override beacon, engagement with the target wireless device may continue. One way of doing this when the wireless device is in idle mode is to use the overrides to move the wireless device to a catch beacon and put the wireless device into traffic mode and use the overrides to control it in that mode. How this works in the context of the CDMA call setup process is show in FIG. 17. First the override beacon overrides the live beacon to send a page as described previously to the target wireless device (1701). The target wireless device responds with an access probe acknowledging the receipt of the page (1702). Embedded in the access probe is class mark information that identifies what capabilities the target wireless device supports. As described later, the override beacon may use this to advantage. The override beacon responds by sending an overriding channel assignment command that commands the phone to go to a traffic channel on a catch beacon (1703). It specifies a frequency band, a frequency channel therein and a code channel within the frequency channel to be that of the catch beacon. The target wireless device moves to the catch beacon's traffic channel and begins emitting a preamble (1704) which continues until the catch beacon responds with an acknowledge indicating that it has detected and timed the target wireless device (1705). At this point the connection between the catch beacon and the target wireless device has been completed.

The above technique is refined further still if the override beacon specifies in the original paging message that the target wireless device is to operate in loopback mode (1706). In this mode the target wireless device will simply regurgitate what it receives from the catch beacon. This permits precise control of when the target wireless device will transmit by controlling when the catch beacon transmits. Loopback (1707) can also be used to advantage to control the power consumption of both the target wireless device and the catch beacon. Here the system can minimize the amount of transmission in either direction including matching it to the needs of the system which is being used to locate the target wireless device, for example, by only sending a message to the target wireless device on the forward channel once per second and thereby forcing the target wireless device to respond once per second and then alerting the location system when to look for energy. This not only conserves power; it also minimizes the conspicuousness of both the catch beacon and the target wireless device. The catch beacon can also avail itself of control messages on the power control channel for the target wireless device and thereby precisely control the emitted power of the target wireless device. For example, the catch beacon may direct the target wireless device to maximum power when it is initially engaged and then adjust the power down until it is at the minimum detectable level. A logical extension is to power down the target wireless device as the catch beacon approaches it so as to not overwhelm the receiver in any location equipment that is tracking the signal (1708).

The override beacon can use the channel assignment message to direct the target wireless device to an unused channel (for example, one belonging to a catch beacon) in order to separate the target wireless device from other wireless devices that are keying (interfering) in the same channel. The separation facilitate location of the target wireless device because the separation improves both the range of acquisition of the target wireless device and disambiguation of the target wireless device from other wireless devices by means of a variety of location techniques such as direction finding, angle of arrival, time difference of arrival or differential power measurements. The propagation characteristics of the target wireless device's signal (most notably reception range) improve with a reduction in transmission wavelength (lower, frequency band). The override beacon therefore will attempt to assign the target wireless device to a catch beacon having a channel in the lowest frequency band available (1709). In this case the lowest frequency band that the target wireless device can operate can be extracted directly from the previously mentioned classmark (1710) or it can be deduced by trial and error as described below.

Inconspicuousness can be increased by periodically forcing the target wireless device to handoff to pseudo-randomly selected channels (in effect frequency hop) amongst an ever changing catch beacon and to transmit at pseudo-random times as per the loopback mode described above (1711). Since the handoff or transmission is controlled strictly by the override or catch beacon and can therefore be completely arbitrary, it becomes impossible for a third party receiver to predict where (in frequency) and when in time the target wireless device will transmit.

In a preferred embodiment, the transmitter of the override/catch beacons employing these methods will have a significantly greater power than that of the target wireless device (asymmetric communications model). Therefore the factor limiting the range of acquisition is the receiver sensitivity in the override/catch beacons. A critical refinement of the technique is to recognize that it is not necessary to actually interpret the messages received by the target wireless device (e.g., CRC the quality indicators). Instead the override beacon needs only to detect the continued "presence" of the target wireless device. One technique is to simply search for Walsh symbol signaling that is consistent with the LCM doled out to the target wireless device (1712). This enables the override beacon to detect the presence of the target wireless device "on channel/pilot" at much lower signal levels (hence at significantly greater range) than could be achieved by actually processing the received signal from the target wireless device (i.e., demodulating the traffic and running quality checks). Once the presence of the target wireless device is no longer detected, the override beacon automatically returns to hunt mode (1713).

Implied in the foregoing is that it is not necessary for the override beacon to actually interpret received messages from the target wireless device. Instead the override beacon can simply assume that the received message from the target is the response to the last message sent by the override beacon and can then send the next message. The override beacon simply waits the maximum amount of time that the target wireless device has to respond to the override beacon's last message before sending the next message. Returning to FIG. 17, the override beacon waits the maximum amount of time after the paging message to send the channel assignment message regardless of whether it detected the response from the target wireless device (1714). This is possible because the call setup process does not in general need any information from the target wireless device in any subsequent response (e.g., there is no frame numbering such as seen in the LAPD signaling common in other cellular standards). A possible exception is the classmark information provided by the target wireless device in the response to the page. The classmark information indicates what capabilities the target wireless device supports. It is therefore possible that the method may attempt to perform a channel assignment that cannot be supported by a particular target wireless device, for example attempting to assign an IS-95B class target wireless device to a CDMA 2000 channel. This problem is generally circumvented by assigning channels that are the lowest common denominator of capability (i.e. take advantage of backward compatibility and always assign radio configuration 1 or 2 used in IS-95B as opposed to 3, 4 or 5 used in CDMA 2000). If this fails (e.g., the target wireless device does not support backward compatibility) then nothing precludes the override beacon from trying several combinations of channel assignments at the expense of time to acquire the target wireless device (1712, 1713).

Using this implied reception technique, the override beacon can become the catch beacon by moving (tuning) to the assigned channel to look for the target wireless device preamble before sending the acknowledge message. The now catch beacon then simply monitors the signaling as described above to determine if and when the target wireless device has been lost at which time it reverts to searching for and engaging the target wireless device as described in the foregoing (1713). If the preamble is not forthcoming then it is possible that target wireless device did not respect the channel assignment and therefore the catch beacon reverts to the override beacon and retries the engage process using a different channel assignment (e.g., trying other bands or radio configurations).

Nothing in this description precludes use of the a single beacon to engage multiple target wireless devices simultaneously and distribute them on different frequency channels. As described for the target wireless device detection process, it is not necessary to camp a receiver on each target wireless device but instead single beacon time multiplexed to operate as either a override or catch beacon can periodically hop and check the signal from each target wireless device. Further still it is possible to round robin transmission on the forward channel to the target wireless device as a "keep-alive" function while minimizing the crest factors associated with simultaneous transmission of multiple signals and therefore in principle a single combined override/catch beacon can be made to handle multiple individual target wireless devices. The only limitation may be the number of available unused service provider frequency channels. If the override/catch beacon has placed the target wireless devices in loopback mode multiple target wireless devices can be placed on the same frequency channel and will effectively time share it as controlled by the override/catch beacon.

Figure 18:
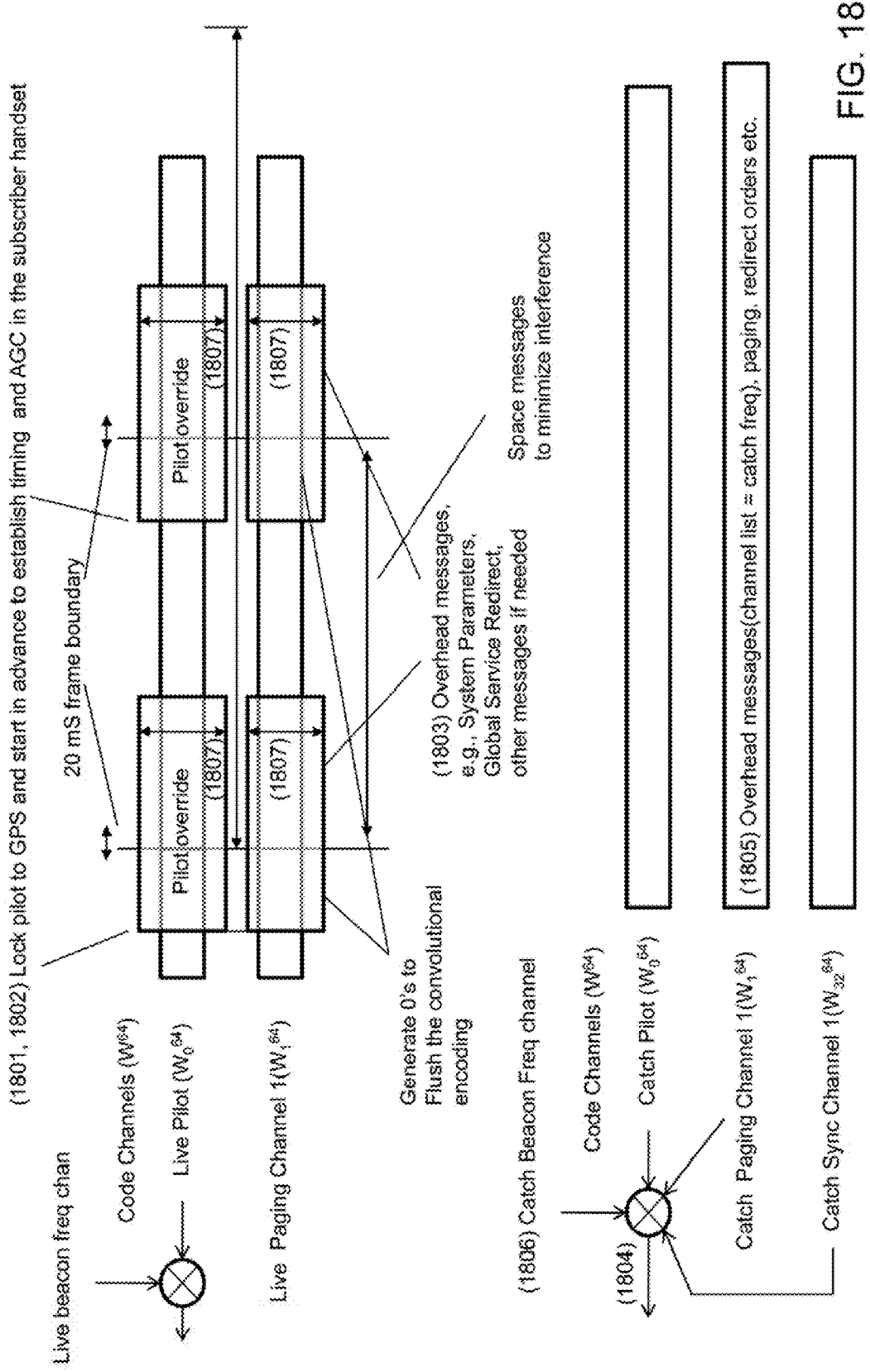
FIG. 18—Method of inventorying heretofore unknown phones that are idle by moving all phones to an unused frequency channel and subsequently recording their registrations.

Refinements for Interrogating of Heretofore Unknown Wireless Devices so as to Minimize the Response Time and Collateral Interference while Maximizing the Potential Range of Acquisition Overrides of control messages by the override beacon can minimize the response time required for general interrogation of wireless devices (i.e., taking inventory as opposed to targeting a specific wireless device) while minimizing collateral interference. The method is shown in FIG. 18. An override beacon is proffered on top of any given live CDMA beacon operating on some frequency channel (1801). The override beacon is locked to GPS (1802) and can be generated over top of the live pilot or can alternately be generated over any other pilot that is a neighbor list of on the live beacon's neighbor list. Generation on top of the live beacon pilot is preferable to preclude any subsequent attempt at handoff by the live network because the target wireless device has reported the neighbor pilot to the live beacon. This is made more likely as the override beacon must generate the pilot for several seconds to gain the attention of the wireless devices to be interrogated.

In this refinement, the override beacon, termed in the following the redirect beacon, only generates the minimum complement of overhead messages necessary to either direct a target wireless device operating off of the live beacon to reregister or to redirect the target wireless device to a catch beacon. The purpose as described further below is to minimize the amount of time the override beacon's transmitter is on and therefore interfering with wireless devices that are in an active traffic state. Most of the necessary overhead messages will be clones of the live beacon. The most important exception is the configuration field for the live beacon that is in the header of each message. As described previously all idle mode phones will regularly monitor the overhead messages to determine if the live beacon configuration has changed. By modifying these fields to be different from that of the live beacon the phone will be forced to reconfigure to the new network settings.

The redirect beacon can operate in one of two modes: either forced in situ reregistration or redirection to a catch beacon. In the former case the override beacon offers a new system parameters message that modifies the registration zone field and which as described for baiting beacons forces the wireless devices to believe they are now in a new registration zone and consequently to reregister.

In the latter case the configuration field in the system parameters message is changed but the registration zone is unchanged, preventing the devices from reregistering. Instead a global services redirect message with a new configuration field is introduced that specifies the band, channel and pilot PN offset for the target wireless device in the catch beacon to which the target wireless device should redirect (1803). If the override beacon overrides the live beacon's pilot, it is not necessary for the override beacon to generate a pilot for several seconds in order to get the attention of the target wireless device. Instead, the override beacon generates the override messages as described for the surgical paging messages (FIG. 3 without quick paging) by only generating the pilot briefly in advance of the sending the override message in order to acclimate the target wireless device(s). The technique anticipates falling back to continuous transmission of pilots for only a few seconds, but always for less than the amount of time that would cause a target wireless device to drop and thereby cause a brief period of silence in a call.

A catch beacon (1804) also locked to GPS is generated on a target frequency channel that is presumably but not necessarily a clone of the live beacon with the important difference being that the frequency channel list message only lists the catch beacon so that once target wireless devices register with the catch beacon they stay on that beacon (1805). The frequency channel of the catch beacon is one that is not in the frequency channel list message of the beacon channel that is overridden (1806). Because the catch beacon is not operating on a frequency channel used by the live network and therefore does not interfere with the operations of the network in any way, the catch beacon can remain on indefinitely.

When a baiting beacon is used as described in U.S. Ser. No. 12/065,225, the redirect message fields provided by the baiting beacon specify the frequency and pilot PN that is being used by the baiting beacon. This causes the target wireless device to immediately move to the baiting beacon. In order for all of the target wireless devices to respond to the baiting beacon, the baiting beacon must be on for 10s of seconds. The same baiting beacon is then moved to each frequency channel that is enumerated in the frequency channel list of the live beacon. Therefore the baiting beacon can require several minutes to interrogate all of the target wireless devices in some operational area and in doing so very likely terminate the calls of all of the subscribers that are in a call state.

If the redirect beacon is an override beacon, the redirect beacon need only send the override overhead messages for no more than a second in theory (or perhaps a few seconds in practice if a message fails to be received by the target wireless device) on given frequency channel in order to reregister or redirect all target wireless devices that are in idle mode listening on that channel. After this time the override redirect messages can be terminated. Another key improvement is that the override messages are insensitive to the level of power used to broadcast them. The transmit periods are too brief to cause a call in progress to disconnect. Consequently, both the redirect and catch beacons can be at maximum power (1807), which, among other things, maximizes the potential range of the interrogator.

The technique anticipates generating redirect beacons on all of the frequency channels simultaneously. This results in redirection of all of the target wireless devices in some operational area to the catch override beacon within a few seconds. However if transmit resources are limited, nothing precludes round-robining the redirect beacon briefly on each of the live frequency channels. The only penalty is the time to acquire all of the target wireless devices. A potential improvement is to stagger the overriding of overhead messages across all of the frequency channels so as to minimize the peak power requirements of any subsequent amplification or equivalently allow the maximum transmit power on each channel and therefore maximize the potential range of effect. For example if two channels are on simultaneously, each must be scaled back by 6 dB to keep the amplifier from going into saturation. A 6 dB reduction in transmit power translates into a halving of the relative effective range of influence in a free space propagation model.

Also nothing in the techniques precludes using multiple simultaneous catch beacons as loading, unused frequency channel and resource availability warrants. For example multiple catch beacons can lessen the collision effects caused by all of the target wireless devices crowding onto the single catch beacon at once. A further refinement is to have multiple catch beacons include each other in their frequency channel list so as to avail themselves of the built-in load balancing feature of the standards. Here the standards dictate that a wireless device must take the frequency channel list in the overhead messages and its MIN and perform a hash algorithm function to determine on which frequency channel it will operate. An alternative is to have each catch beacon have only itself in its channel list and then manage how target wireless devices are allocated to a catch beacon at a higher level. In this case the redirect beacon can determine which catch override beacon all target wireless devices operating off of some live beacon will be redirected to or can redirect all of the wireless devices to a particular catch override beacon which can subsequently issue yet another redirect message that sends a target wireless device to yet another catch beacon. The method further anticipates staggering the access probe timing of catch beacons such that a single receiver associated with the redirect beacon can time multiplex across all of the catch beacons and detect when a target wireless device is attempting to register or otherwise communicate with the catch beacon.

Once the target wireless devices are caught they will remain on the catch beacon since the frequency channel list only includes the catch beacon itself or other catch beacons. The invention also makes note that if the catch beacon modifies the registration zone field of the system parameters message, then all of the devices moving to the catch beacon will attempt registration and therefore the catch beacon can inventory all of the devices as they are captured.

The combination of redirect beacons with catch beacons also permits a catch and release capability that will allow only certain target wireless devices to be caught. One method is for the redirect beacon to send an override service redirect message on the paging channel (generally immediately after the target wireless device registers) to each target wireless device that is not of interest. This would then push these target wireless devices back to the live network. A logical extension is to implement surgical access to the network based on subscriber identifiers. Since all of the target wireless devices are presumably captured by the catch beacon, the catch beacon can detect an outgoing call and then send a redirect message back to the target wireless device which will cause the target wireless device to return to the live network to place the call without alerting the subscriber. The target wireless device can be captured again as described above and the process repeated.

For purposes of subsequently targeting the target wireless device for intelligence collection, it is desirable to inform an operator as to the frequency channel a particular target wireless device is presently associated with. Normally when interrogation is performed on a single channel by channel basis this is information can be determined from the channel on which the target wireless device was discovered. However when the target wireless devices are being redirected to catch beacons, there is no way of telling from which frequency channel a target wireless device was redirected. Instead this can be inferred and reported to the operator by inputting the frequency channel list from any of the live beacons and the MIN (phone number of the phone) into the hash algorithm prescribed by the standard.

An important logical extension of the techniques is to manipulate all of the captured target wireless devices without affecting the ongoing operations of the network. For example, an override beacon can disable any given target wireless device by issuing an override maintenance lock order or an override unlock order, respectively. The catch beacon can also capture outgoing call originations or text messages and then subsequently redirect the target wireless device to the live network if this is desirable. There, the call will be placed or placed again if dropped. Similarly, the technique could be extended to have the override beacon take incoming calls or text messages for captured target wireless devices on the live network and subsequently use override control messages to drop the calls in a fashion that keeps the network from going to voice mail and then redirect a captured target wireless device back to the live network in anticipation of the caller placing the call again. In cases where authentication is required to consummate a call in order to get the incoming number or text message, the method can interrogate a captured target wireless device with the network authentication challenge and subsequently respond to the network with the correct authentication response. If resources permit, the override beacons can mount a full man-in-the-middle attack by demodulating the incoming or outgoing calls carried on the live network frequency channel and then remodulating them on the catch beacon frequency channel and similarly the target wireless device operating on the catch beacon frequency channel is demodulated and remodulated on the live network frequency channel.

Preferred Embodiment of an Override Beacon that Surgically Overrides Control Messages A transceiver that may be used to generate the interloping beacons and implement the techniques that have just been described is the ComHouse Wireless Network Subscriber Test (NST), which may be purchased from ComHouse Wireless LP, 221 Chelmsford St., Chelmsford, Mass. 01824. The unit is a software defined radio capable of testing both wireless devices and base stations using the GSM and CDMA standards. NST can interrogate wireless devices by acting as a beacon and can scan cellular environments so as to identify and analyze beacons, and can generate multiple simultaneous signals which can be used as interference signals. The interference signals may be customized with sub-microsecond precision to generate override beacons. The unit can also make and receive outgoing and incoming wireless device calls.

CONCLUSION

The foregoing Detailed Description has disclosed to those skilled in the relevant technologies how to make and new species of interloping beacons including override beacons and catch beacons and how to control target wireless devices using such interloping beacons without causing serious collateral interference to non-target wireless devices operating on the same frequency channel as the target wireless device. The Detailed Description has also disclosed the best methods presently known to the inventor of making and using his interloping beacons. The general principles of his interloping beacons can of course be applied to any signaling standard which, like CDMA, has a pilot channel code channel which provides timing for messages on other code channels. The interactions between an override beacon and a target wireless device are of course limited only by the control messages which the override beacon can override.

Particular details of interloping beacons made according to the principles disclosed herein and of their interactions with target wireless devices will of course depend on the signaling standard which governs the behavior of the target wireless device and the purpose for which the interloping beacon is interacting with the target wireless device. For these reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

The invention claimed is:

1. A method of using an interloping beacon to cause a target wireless device to respond to an overriding control message provided by the interloping beacon rather than to a control message provided by a live beacon of the target wireless device, the target wireless device operating on a frequency channel of the live beacon in a wireless network that operates according to a standard that employs code division multiplexing to define code channels in the frequency channel, the code channels including a pilot channel for a pilot provided by the live beacon, the target wireless device responding to the pilot of the live beacon by listening for a control message provided by the live beacon on another code channel, the control message occurring in the other code channel at a location which is determined by the standard, and the method comprising the steps performed by a signal generator which generates the interloping beacon of:
on the frequency channel of the live beacon, generating an overriding pilot on the pilot channel to which the target wireless device responds rather than to the pilot of the live beacon; and
on the frequency channel of the live beacon, generating the overriding control message at the location in the other code channel specified by the standard for the control message provided by the live beacon,
the overriding pilot and the overriding control message being generated by the signal generator only as long as required to cause the target wireless device to respond to the overriding control message rather than to the control message provided by the live beacon, whereby causing the target wireless device to respond to the overriding control message does not cause another wireless device operating on the frequency channel to respond to the overriding pilot in a manner which is noticeable by a user of the other wireless device.

2. The method set forth in claim 1 wherein:
the other code channel is a public code channel wherein the live beacon provides control messages for the target wireless device and the other wireless device at locations in the public code channel which are specified in the standard for the target wireless device and the other wireless device.

3. The method set forth in claim 2 wherein:
the public code channel is a paging channel wherein the live beacon provides paging messages addressed to the target wireless device and the other wireless device;
and the overriding control message is a paging message addressed to the target wireless device.

4. The method set forth in claim 3 wherein:
the overriding paging message specifies that the target wireless device is to move to a beacon that is another interloping beacon, the target wireless device responding thereto by moving to the other interloping beacon.

5. The method set forth in claim 4 wherein:
the other interloping beacon is a catch beacon that retains the target wireless device on the frequency channel of the catch beacon.

6. The method set forth in claim 5 further comprising the step performed by a signal generator for the catch beacon of:
issuing a control message to the target wireless device which causes the target wireless device to return to the live beacon.

7. The method set forth in claim 3 wherein
the step of generating the overriding control message addressed to the target wireless device includes the steps of:
generating a first overriding control message to which the target wireless device will respond with a response message if the overriding pilot is sufficiently strong at the target wireless device; and
if the target wireless device responds to the first overriding control message with the response message,
generating a second overriding control message which specifies that the target wireless device is to move to a beacon that is another interloping beacon, the target wireless device responding thereto by moving to the other interloping beacon.

8. The method set forth in claim 2 wherein:
there is a plurality of the public code channels, the plurality including a quick alert control message public code channel and a full control message public channel, the quick alert control message for the target wireless device indicating that a full control message for the target wireless device will follow on the full control message public channel and the target wireless device responding to the quick alert control message by responding to the following full control message; and
the method further comprises the step performed in the signal generator of:
on the frequency channel of the live beacon, generating an overriding quick alert control message for the target wireless device at the location of the quick alert control message provided by the live beacon,
the overriding pilot, the overriding control message, and the overriding quick alert control message being generated by the signal generator only as long as required to cause the target wireless device to respond to the overriding quick alert message by responding to the overriding control message.

9. The method set forth in claim 8 wherein:
the full control message public channel is a paging channel wherein the live beacon provides paging messages for the target wireless device and the other wireless device;
the quick alert control message channel is a quick page alert channel wherein the live beacon provides quick page alert signaling including a quick page alert control message for the target wireless device which indicates that a paging message will follow on the paging channel for the target wireless device; and
there is a plurality of the overriding control messages, including
an overriding quick page alert control message and
an overriding paging message.

10. The method set forth in claim 9 wherein:
the overriding paging message includes an overriding null paging message followed by an overriding non-null paging message,
the overriding null paging message resetting the paging channel decoder of the target wireless device for the overriding non-null paging message.

11. The method set forth in claim 9 wherein:
there is another interloping beacon;
the overriding paging message specifies that the target wireless device is to move to the other interloping beacon; and
the target wireless device responds thereto by moving to the other interloping beacon.

12. The method set forth in claim 1 wherein:
the other code channel is a dedicated code channel which is dedicated to the target wireless device; and the dedicated code channel has a dedicated code channel control message for the target wireless device at a location in the dedicated code channel which is determined by the standard.

13. The method set forth in claim 12 wherein
the other wireless device also has a dedicated code channel in the live beacon which is dedicated to the other wireless device and
the method further comprises the step of:
  determining which dedicated code channel is dedicated to the target wireless device.

14. The method set forth in claim 1 wherein:
the target wireless device responds to the overriding control message by performing a handover to another interloping beacon specified in the overriding control message; and
the other interloping beacon fails to respond to the handover,
whereby the target wireless device returns to the live beacon after the other interloping beacon fails to respond.

15. The method set forth in claim 1 wherein:
the target wireless device responds to the overriding control message by associating itself with a dedicated code channel of the code channels, the dedicated code channel being specified in the overriding control message,
whereby the interloping beacon which provides the overriding control message or another interloping beacon may use control messages in the dedicated code channel to control the target wireless device.

16. The method set forth in claim 15 wherein:
the interloping beacon which is using the control messages to control the target device makes independent connections between the target wireless device and the live beacon and relays messages between them.

17. The method set forth in claim 15 wherein:
the target wireless device further responds to the overriding control message by putting itself into loopback mode,
whereby the target wireless device retransmits what the target wireless device receives from the interloping beacon which provides the overriding control message or another interloping beacon that is controlling the target wireless device.

18. The method set forth in claim 15 wherein:
the dedicated code channel specified in the overriding control message has characteristics which make the target wireless device easier to disambiguate from the other wireless device and to track the target wireless device.

19. The method set forth in claim 1 wherein:
the target wireless device responds to the overriding control message by setting the transmission power level of the target wireless device as specified therein.

20. The method set forth in claim 1 wherein:
the target wireless device responds to the overriding control message by disabling itself.

21. The method set forth in claim 1 wherein:
the overriding control message causes wireless devices operating on the pilot channel of the live beacon to move from the live network to an interloping beacon that is a catch beacon, the catch beacon being generated such that the catch beacon elicits a registration from each of the wireless devices that moves to the catch beacon.

22. A signal generator configured to generate an interloping beacon, the interloping beacon causing a target wireless device to respond to an overriding control message provided by the interloping beacon rather than to a control message provided by a live beacon, the target wireless device operating on a frequency channel of the live beacon in a wireless network that operates according to a standard that employs code division multiplexing to define code channels in the frequency channel, the code channels including a pilot channel for a pilot generated by the live beacon, the target wireless device responding to the pilot of the live beacon by listening for a control message generated by the live beacon on another code channel, the control message occurring in the other code channel at a location which is determined by the standard,
  and the interloping beacon being characterized in that:
    the interloping beacon provides on the frequency channel of the live beacon:
      an overriding pilot on the pilot channel to which the target wireless device responds rather than to the pilot of the live beacon; and
      the overriding control message at the location in the other code channel of the control message provided by the live beacon,
  the overriding pilot and the overriding control message being generated by the interloping beacon only as long as required to cause the target wireless device to respond to the overriding control message rather than to the control message provided by the live beacon.

* * * * *